United States Patent
Song et al.

(10) Patent No.: US 11,258,666 B2
(45) Date of Patent: Feb. 22, 2022

(54) METHOD, DEVICE, AND SYSTEM FOR IMPLEMENTING MUX MACHINE

(71) Applicant: Huawei Technologies Co., Ltd., Shenzhen (CN)

(72) Inventors: Bo Song, Nanjing (CN); Feng Qian, Nanjing (CN); Hui Zhao, Nanjing (CN); Chong Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 91 days.

(21) Appl. No.: 16/727,596

(22) Filed: Dec. 26, 2019

(65) Prior Publication Data
US 2020/0136912 A1  Apr. 30, 2020

Related U.S. Application Data

(63) Continuation of application No. PCT/CN2018/075609, filed on Feb. 7, 2018.

(30) Foreign Application Priority Data

Jun. 28, 2017 (CN) .......................... 201710508989.0

(51) Int. Cl.
*H04L 12/24* (2006.01)
*H04L 41/0893* (2022.01)
*H04L 45/24* (2022.01)

(52) U.S. Cl.
CPC ........ *H04L 41/0893* (2013.01); *H04L 45/245* (2013.01)

(58) Field of Classification Search
CPC ............... H04L 41/0893; H04L 45/245; H04L 43/0811; H04L 41/0879; H04L 51/00; H04L 45/50
See application file for complete search history.

(56) References Cited

U.S. PATENT DOCUMENTS

| | | | |
|---|---|---|---|
| 2011/0038267 A1* | 2/2011 | Smith | H04L 43/0811 370/248 |
| 2013/0238738 A1* | 9/2013 | Yu | H04L 51/00 709/206 |

(Continued)

FOREIGN PATENT DOCUMENTS

| | | |
|---|---|---|
| CN | 101945042 A | 1/2011 |
| EP | 2288079 A1 | 2/2011 |

(Continued)

OTHER PUBLICATIONS

IEEE P802.11ax/D1.2, "Part 11: Wireless LAN Medium Access Control (MAC) and Physical Layer (PHY) Specifications, Amendment 6: Enhancements for High Efficiency WLAN," Apr. 2017, 488 pages.

*Primary Examiner* — Ayaz R Sheikh
*Assistant Examiner* — Louis Samara
(74) *Attorney, Agent, or Firm* — Conley Rose, P.C.

(57) ABSTRACT

A method, a device, and a system for implementing a multiplexer (mux) machine, where the method includes setting a mux machine on a first aggregation port to be in a PROTECT_WAITING state, when the mux machine is in the PROTECT_WAITING state, determining that the first aggregation port is not in a collecting and distributing state, and sending, to a second network device, a first Link Aggregation Control Protocol Data Unit (LACPDU) packet that is used to notify that the first aggregation port is in the collecting and distributing state, and when a second LACPDU packet that is from the second network device and indicating that a second aggregation port is in the collecting and distributing state is received, switching a status of the mux machine from the PROTECT_WAITING state to a COLLECTING_DISTRIBUTING state, and setting the first aggregation port to be in the collecting and distributing state.

20 Claims, 7 Drawing Sheets

(56) References Cited

U.S. PATENT DOCUMENTS

| | | | | |
|---|---|---|---|---|
| 2015/0124837 A1* | 5/2015 | Saltsidis | ............. | H04L 41/0879 |
| | | | | 370/419 |
| 2017/0063672 A1* | 3/2017 | Chhabra | ................. | H04L 45/28 |
| 2017/0289018 A1* | 10/2017 | Iyer | ..................... | H04L 41/0823 |
| 2019/0089627 A1* | 3/2019 | Mirsky | ................... | H04L 45/50 |

FOREIGN PATENT DOCUMENTS

| WO | 2015070383 A1 | 5/2015 | | |
|---|---|---|---|---|
| WO | WO-2015070383 A1 * | 5/2015 | ........... | H04L 45/245 |

\* cited by examiner

METHOD, DEVICE, AND SYSTEM FOR IMPLEMENTING MUX MACHINE

CROSS-REFERENCE TO RELATED APPLICATIONS

This application is a continuation of International Patent Application No. PCT/CN2018/075609 filed on Feb. 7, 2018, which claims priority to Chinese Patent Application No. 201710508989.0 filed on Jun. 28, 2017. The disclosures of the aforementioned applications are hereby incorporated by reference in their entireties.

TECHNICAL FIELD

This disclosure relates to the field of communications technologies, and in particular, to a method, a device, and a system for implementing a multiplexer (mux) machine. In particular, this disclosure relates to a technology for implementing a mux machine in a network running a Link Aggregation Control Protocol (LACP).

BACKGROUND

An LACP provides a standard negotiation manner for network devices that exchange data. For network devices on two ends that are aggregated according to the LACP, an aggregated link may be automatically formed between the network devices based on their respective configurations, and the network devices send and receive data over the aggregated link. After the aggregated link is formed, the network devices on the two ends of the aggregated link are responsible for maintaining a status of the link. When an aggregation condition changes, link aggregation is automatically adjusted or dissolved.

An LACP state machine maintains information about each aggregation port and information about a partner aggregation port of the aggregation port on a port basis, calculates an aggregation state of each aggregation port, exchanges an LACP packet with another network device, and invokes the aggregation port to manage an aggregation group and an aggregation member. The LACP state machine includes a receive state (RX) machine, a periodic transmission (PTX) machine, selection logic, a mux machine, and a transmission (TX) machine. The mux machine is configured to attach an aggregation port to a selected aggregator or detach an aggregation port from an unselected aggregator, and enable or disable a collecting and distributing state of the aggregation port based on current protocol information.

In an application scenario, a network device runs a mux machine associated with an aggregation port of the network device. When a trigger condition is met, the network device switches a status of the mux machine on the aggregation port of the network device from an ATTACHED state to a COLLECTING_DISTRIBUTING state. However, the network device cannot ensure that a mux machine associated with an aggregation port of a partner network device of the network device is in the COLLECTING_DISTRIBUTING state. Therefore, in the application scenario, for an aggregated link between the network device and the partner network device, an aggregation port on one end may be in the collecting and distributing state, and an aggregation port on the other end may be not in the collecting and distributing state. Consequently, a packet loss occurs in service traffic.

SUMMARY

In view of this, embodiments provide a method, a device, and a system for implementing a mux machine, and are applied to a network running an LACP to detect and process statuses of aggregation ports on two ends of an aggregated link in the mux machine, thereby alleviating a packet loss generated during service traffic transmission.

Technical solutions provided in the embodiments are as follows.

According to a first aspect, a method for implementing a mux machine is provided. The method is applied to a network running an LACP, the network includes a first network device and a second network device, and a first aggregation port of the first network device is connected to a second aggregation port of the second network device over an aggregated link. The method includes setting, by the first network device, a mux machine on the first aggregation port to be in a PROTECT_WAITING state, where the PROTECT_WAITING state is used to identify that the first aggregation port is not in a collecting and distributing state, but notify another network device that a status of the first aggregation port is the collecting and distributing state, when the mux machine is in the PROTECT_WAITING state, determining, by the first network device, that the first aggregation port is not in the collecting and distributing, and sending a first LACP data unit (LACPDU) packet to the second network device, where the first LACPDU packet is used to notify the second network device that the first aggregation port is in the collecting and distributing state, and trigger the second network device to set the second aggregation port to be in the collecting and distributing state. Then determining, by the first network device, whether a second LACPDU packet from the second network device is received, where the second LACPDU packet is used to indicate that the second aggregation port is in the collecting and distributing state, and when the first network device determines that the second LACPDU packet is received, switching, by the first network device, a status of the mux machine from the PROTECT_WAITING state to a COLLECTING_DISTRIBUTING state, and setting the first aggregation port to be in the collecting and distributing state.

Based on the solution provided in this embodiment, the first network device sets the mux machine on the first aggregation port to be in the PROTECT_WAITING state. When the mux machine is in the PROTECT_WAITING state, the first network device determines that the first aggregation port is not in the collecting and distributing state. Then, the first network device sends, to the second network device, the first LACPDU packet that is used to notify that the first aggregation port is in the collecting and distributing state. In addition, when the first network device determines that the second LACPDU packet that is from the second network device and that is used to indicate that the second aggregation port is in the collecting and distributing state is received, the first network device switches the status of the mux machine from the PROTECT_WAITING state to the COLLECTING_DISTRIBUTING state, and sets the first aggregation port to be in the collecting and distributing state. In this implementation, Single-port UP of the aggregated link in the mux machine is detected and processed, thereby alleviating a packet loss generated during service traffic transmission.

In a possible implementation of the first aspect, before the mux machine on the first aggregation port is in the PROTECT_WAITING state, the mux machine is in an ATTACHED state, and the method further includes receiving, by the first network device, a third LACPDU packet from the second network device, and when the first network device determines that the first aggregation port is in a SELECTED state, determines, based on the third LACPDU packet, that the second aggregation port is in a synchronization state, and determines, based on the third LACPDU packet, that the second aggregation port is not in the collecting and distributing state, switching, by the first network device, the status of the mux machine from the ATTACHED state to the PROTECT_WAITING state.

Based on the foregoing implementation, the first network device detects a synchronization state of the second aggregation port using the third LACPDU packet, and further detects the collecting and distributing state of the second aggregation port using the third LACPDU packet. Therefore, it is ensured that after the mux machine enters the PROTECT_WAITING state, detection on a case in which the second aggregation port changes from not being in the collecting and distributing state to being in the collecting and distributing state starts.

In another possible implementation of the first aspect, that the first network device determines, based on the third LACPDU packet, that the second aggregation port is in a synchronization state includes determining, by the first network device, that first information included in the third LACPDU packet matches second information of the first aggregation port that is stored in the first network device, where the first information includes Partner_Port, Partner_Port_Priority, Partner_System, Partner_System Priority, Partner_Key, and Partner_State.Aggregation, and the second information includes Actor_Port_Number, Actor_Port_Priority, Actor_System, Actor_System_Priority, Actor_Oper_Port_Key, and Actor_Oper_Port_State.Aggregation, and determining, by the first network device, that Actor_State.Synchronization included in the third LACPDU packet is the synchronization state.

In still another possible implementation of the first aspect, the method further includes, when the first network device determines, based on the third LACPDU packet, that the second aggregation port is in the synchronization state, and determines, based on the third LACPDU packet, that the second aggregation port is in the collecting and distributing state, switching, by the first network device, the status of the mux machine from the ATTACHED state to the COLLECTING_DISTRIBUTING state, and setting the first aggregation port to be in the collecting and distributing state.

Based on the foregoing implementation, when the second aggregation port is in the collecting and distributing state, the first network device quickly enters a dual-port collecting and distributing state, thereby alleviating a packet loss generated during service traffic transmission.

In still another possible implementation of the first aspect, the method further includes receiving, by the first network device, a fourth LACPDU packet from the second network device, where the fourth LACPDU packet is used to indicate that the second aggregation port is not in the collecting and distributing state, and when determining, based on the fourth LACPDU packet, that the second aggregation port is not in the collecting and distributing state, switching, by the first network device, the status of the mux machine from the COLLECTING_DISTRIBUTING state to the PROTECT_WAITING state.

Based on the foregoing implementation, after receiving the fourth LACPDU packet indicating that a status of the second aggregation port is not the collecting and distributing state, the first network device switches the status of the mux machine to the PROTECT_WAITING state in a timely manner. This helps alleviate a packet loss generated during service traffic transmission.

In still another possible implementation of the first aspect, the method further includes switching, by the first network device, the status of the mux machine from the PROTECT_WAITING state to the ATTACHED state when at least one of the following conditions is met: the first network device determines that the first aggregation port is in an UNSELECTED state, the first network device determines that the first aggregation port is in a STANDBY state, and the first network device receives a fifth LACPDU packet from the second network device, and determines, based on the fifth LACPDU packet, that the second aggregation port is not in the synchronization state.

In still another possible implementation of the first aspect, the first network device includes a timer, and when the mux machine on the first aggregation port is in the PROTECT_WAITING state, the method further includes starting, by the first network device, the timer, and when the first network device determines that the second LACPDU packet from the second network device is not received even if the timer expires, switching, by the first network device, the status of the mux machine from the PROTECT_WAITING state to an ATTACHED state.

In still another possible implementation of the first aspect, when the mux machine is in the PROTECT_WAITING state, and the timer expires, the method further includes setting, by the first network device, the aggregated link to be Single-port_UP, where Single-port_UP is used to indicate that an aggregation port on one end of the aggregated link is in the collecting and distributing state, and an aggregation port on the other end is not in the collecting and distributing state.

Based on the foregoing implementation, the status of the mux machine may be prevented from being repeatedly switched between the ATTACHED state and the PROTECT_
WAITING state.

In the first aspect, optionally, in a DETACHED state, the first network device sets a value of the Single-port_UP flag bit to FALSE.

In the first aspect, optionally, duration of the timer is greater than or equal to three seconds (s) and the duration of the time is less than or equal to 90 s.

According to a second aspect, a first network device is provided, and the first network device has a function of implementing behavior of the first network device in the foregoing method. The function may be implemented based on hardware, or may be implemented based on hardware executing corresponding software. The hardware or software includes one or more modules corresponding to the function.

In a possible design, a structure of the first network device includes a processor and an interface. The processor is configured to support the first network device in performing a corresponding function in the foregoing method. The interface is configured to support communication between the first network device and a second network device, and send information or an instruction in the foregoing method to the second network device, or receive information or an instruction in the foregoing method from the second network device. The first network device may further include a memory. The memory is configured to be coupled to the processor, and the memory stores a program instruction and data that are necessary for the first network device.

In another possible design, the first network device includes a processor, a transmitter, a random access memory (RAM), a read-only memory (ROM), and a bus. The processor is coupled to the transmitter, the RAM, and the ROM using the bus. When the first network device needs to run, a bootloader in a basic input/output system (BIOS) or an embedded system that is built into the ROM is used to boot a system to start, and boot the first network device to enter a normal running state. After entering the normal running state, the first network device runs an application program and an operating system in the RAM, to enable the processor to perform the method in any one of the first aspect or the possible implementations of the first aspect.

According to a third aspect, a first network device is provided, and the first network device includes a main control board and an interface board, and may further include a switching board. The first network device is configured to perform the method in any one of the first aspect or the possible implementations of the first aspect. Further, the first network device includes a module configured to perform the method in any one of the first aspect or the possible implementations of the first aspect.

According to a fourth aspect, a first network system is provided, and the first network system includes a controller and a first forwarding device. The first forwarding device includes an interface board, and may further include a switching board. The first forwarding device is configured to perform a function of the interface board in the third aspect, and may further perform a function of the switching board in the third aspect. The controller includes a receiver, a processor, a transmitter, a RAM, a ROM, and a bus. The processor is coupled to the receiver, the transmitter, the RAM, and the ROM using the bus. When the controller needs to run, a bootloader in a basic input/output system or an embedded system that is built into the ROM is used to boot the system to start, and boot the controller to enter a normal running state. After entering the normal running state, the controller runs an application program and an operating system in the RAM, to enable the processor to perform a function of the main control board in the third aspect.

According to a fifth aspect, a network system for implementing a mux machine is provided, where the network system includes a first network device and a second network device, and the first network device and/or the second network device each are/is the first network device in the foregoing third aspect, the fourth aspect, the second aspect or the fifth aspect.

According to a sixth aspect, a computer storage medium is provided and is configured to store a program, code, or an instruction used by the foregoing first network device, and when a processor or a hardware device executes the program, the code, or the instruction, functions or steps of the first network device in the foregoing aspects may be completed.

According to the foregoing solutions, the embodiments provide the method, the device, and the system for implementing a mux machine. The first network device sets the mux machine on the first aggregation port to be in the PROTECT_WAITING state. When the mux machine is in the PROTECT_WAITING state, the first network device determines that the first aggregation port is not in the collecting and distributing state. Then, the first network device sends, to the second network device, the first LACPDU packet that is used to notify that the first aggregation port is in the collecting and distributing state. In addition, when the first network device determines that the second LACPDU packet that is from the second network device and that is used to indicate that the second aggregation port is in the collecting and distributing state is received, the first network device switches the status of the mux machine from the PROTECT_WAITING state to the COLLECTING_DISTRIBUTING state, and sets the first aggregation port to be in the collecting and distributing state. In the implementations, Single-port_UP of the aggregated link in the mux machine is detected and processed, thereby alleviating a packet loss generated during service traffic transmission.

DESCRIPTION OF EMBODIMENTS

The following separately provides detailed descriptions of specific embodiments.

For details of an LACP in this disclosure, refer to descriptions in the Institute of Electrical and Electronics Engineers (IEEE) 802.1AX and IEEE 802.3AD. IEEE 802.1AX and IEEE 802.3AD are incorporated herein by reference in their entireties. In embodiments of this disclosure, TRUE indicates "true" or "condition is met", and in computer coding, a value of TRUE may be "1", and FALSE indicates "false" or "condition is not met", and in computer coding, a value of FALSE may be "0". In the embodiments, UP indicates that a port is enabled or available, to be specific, the port is allowed to send and receive data packets, and DOWN indicates that a port is disabled or unavailable, to be specific, the port is not allowed to send or receive a data packet. In the embodiments, "determining" may be implemented through "setting" or through "keeping".

Figure 1:
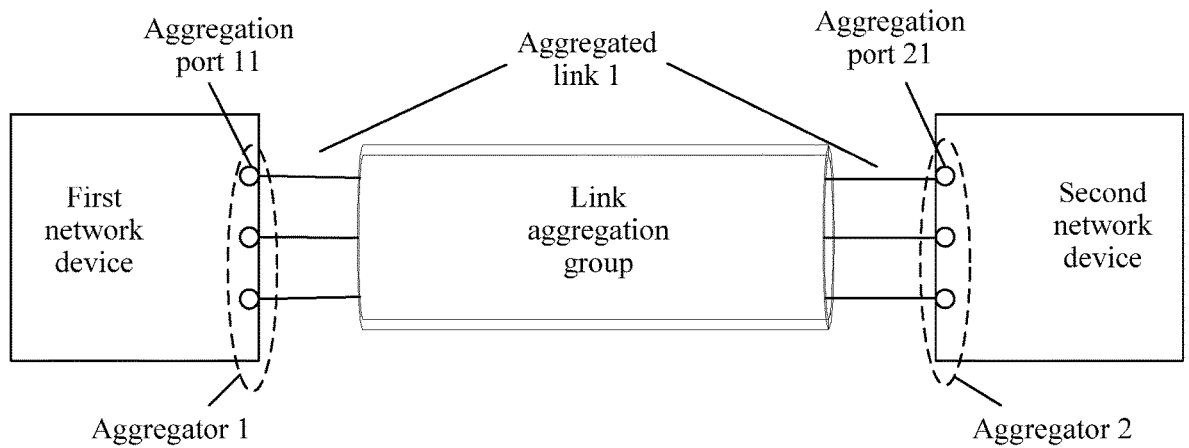
FIG. 1 is a schematic structural diagram of a network running an LACP according to an embodiment.

FIG. 1 is a schematic structural diagram of a network running an LACP according to an embodiment. As shown in FIG. 1, the network includes a first network device and a second network device. The first network device communicates with the second network device using a link aggregation group (LAG). The LAG includes at least one aggregated link. For example, the LAG includes an aggregated link 1, and the first network device communicates with the second network device over the aggregated link 1. One end of the aggregated link 1 is an aggregation port 11 on the first network device, and the other end of the aggregated link 1 is an aggregation port 21 on the second network device. An aggregator 1 on the first network device and an aggregator 2 on the second network device are associated with the LAG The aggregator 1 and the aggregator 2 are respectively configured to manage aggregation ports of an aggregated link included in the LAG for example, the aggregator 1 manages the aggregation port 11, and the aggregator 2 manages the aggregation port 21.

FIG. 1 shows two network devices. It should be understood that a quantity of network devices included in the network is not limited, and there may be two, three, or more network devices. For example, the network further includes a third network device, the first network device communicates with the second network device using an LAG 1, and the first network device communicates with the third network device using an LAG 2. Another network device may be included between two network devices that are connected using an LAG For example, the LAG between the first network device and the second network device includes a switch. The first network device and the second network device each may be a physical device, and the physical device includes a router or a switch. The first network device and the second network device each may be connected to another network device. For example, the first network device is connected to a client, and the second network device is connected to a server. The client communicates with the server through the network shown in FIG. 1.

For definitions of the LAG the aggregated link, the aggregation port, and the aggregator in this embodiment, refer to descriptions in the IEEE 802.1AX. Details are not described herein. The network device may include one or more aggregators. A quantity of aggregators included in the network device may be greater than, less than, or equal to a quantity of aggregation ports included in the network device. One aggregation port on the network device may belong to different aggregators.

In FIG. 1, the first network device and the second network device separately run the LACP. Further, each aggregation port of the first network device and the second network device is associated with one LACP state machine. For example, the aggregation port 11 is associated with an LACP state machine (not shown), and the aggregation port 21 is associated with another LACP state machine (not shown). Because aggregation ports are in a one-to-one correspondence with LACP state machines, the LACP state machine may be understood as an LACP state machine implemented by the first network device and the second network device on each aggregation port. The LACP state machine includes an RX machine, a PTX machine, selection logic, a mux machine, and a TX machine. For definitions and implementation principles of the five sub state machines included in the LACP state machine, refer to descriptions in the IEEE 802.1AX. Details are not described herein. On each aggregation port of the first network device and the second network device, the state machine is invoked to implement link aggregation and de-aggregation.

Figure 2A:
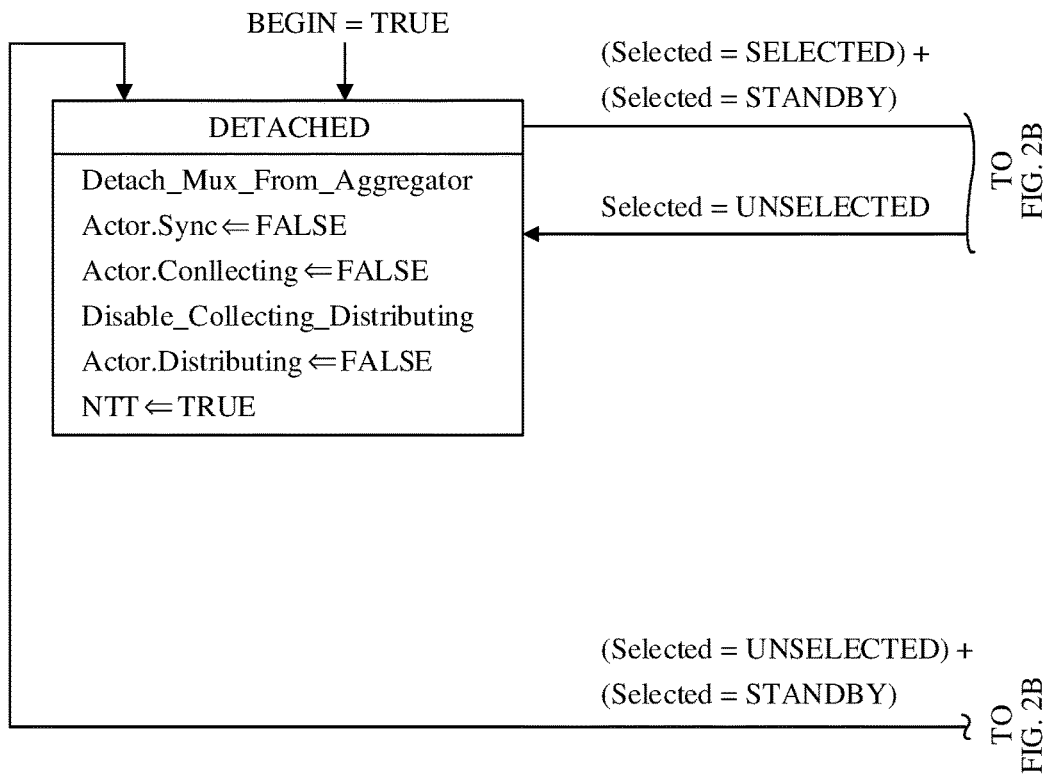
FIG. 2A and FIG. 2B are a status diagram of a mux machine according to an embodiment.
Figure 2B:
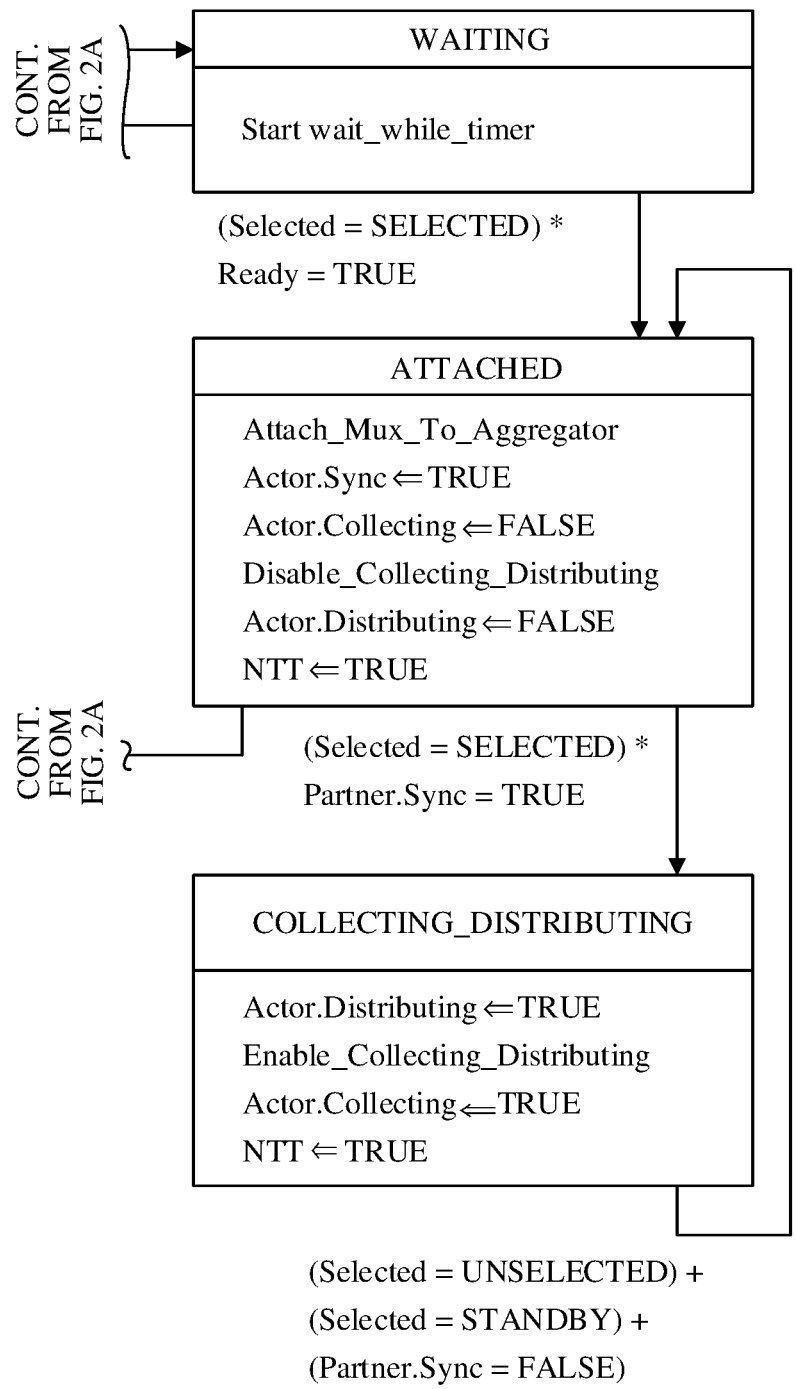

An example in which a mux machine is implemented on the aggregated link 1 in FIG. 1 is used for description. One end of the aggregated link 1 is the aggregation port 11 on the first network device, and the other end of the aggregated link 1 is the aggregation port 21 on the second network device. The mux machine is separately implemented on the aggregation port 11 and the aggregation port 21. Further, the first network device implements the mux machine on the aggregation port 11, and the second network device implements the mux machine on the aggregation port 21. FIG. 2A and FIG. 2B are a status diagram of a mux machine in a coupled control mode. As shown in FIG. 2A and FIG. 2B, the mux machine includes four states: a DETACHED state, a WAITING state, an ATTACHED state, and a COLLECTING_DISTRIBUTING state. In FIG. 2A and FIG. 2B, in the mux machine implemented on the aggregation port 11, the first network device is considered as an actor, and the second network device is considered as a partner, and in the mux machine implemented on the aggregation port 21, the second network device is considered as an actor, and the first network device is considered as a partner. In FIG. 2A and FIG. 2B, "+" represents "or", and "*" represents "and".

The first network device implements the mux machine on the aggregation port 11, and the mux machine enters the DETACHED state by default during initialization. When the mux machine is in the DETACHED state, the first network device performs determining Actor Oper_Port_State.Synchronization (Actor.Sync) as FALSE, which indicates that the aggregation port 11 of the first network device is not in a synchronization state, or may be considered that the aggregation port 11 of the first network device is in an asynchronization state, where Actor.Sync is used to indicate a synchronization state of the aggregation port 11 of the first network device, determining Actor_Oper_Port_State.Distributing (Actor.Distributing) as FALSE, which indicates that the aggregation port 11 is not in a distributing state, or may be considered that the aggregation port 11 is in a non-distributing state, where Actor.Distributing is used to indicate a distributing state of the aggregation port 11, determining Actor_Oper_Port_State.Collecting (Actor.Collecting) as FALSE, which indicates that the aggregation port 11 is not in a collecting state, or may be considered that the aggregation port 11 is in a non-collecting state, where Actor.Collecting is used to indicate a collecting state of the aggregation port 11, and determining Need To Transmit (NTT) as TRUE, where NTT is used to indicate whether an LACPDU packet is allowed to be transmitted between the first network device and the second network device.

In this embodiment, a distributing state and a collecting state of an actor operation port may be respectively indicated using two fields, for example, Actor.Collecting and Actor.Distributing described above. Alternatively, a distributing state and a collecting state of an actor operation port may be indicated using one field, for example, Actor.Collecting_Distributing. In a same principle, a distributing state and a collecting state of a partner operation port may be respectively indicated using two fields, for example, Partner.Collecting and Partner.Distributing. Alternatively, a distributing state and a collecting state of an partner operation port may be indicated using one field, for example, Partner.Collecting_Distributing. In this embodiment, both a manner of respectively using the Collecting field and the Distributing field for indication and a manner of using Collecting_Distributing for indication may be represented as "collecting and distributing state". That is, both the manner of respectively using the Collecting field and the Distributing field for indication and the manner of using Collecting_Distributing for indication are implementations of "collecting and distributing state".

When the first network device determines that the aggregation port 11 is in a SELECTED state (as shown in FIG. 2A, Selected=SELECTED) or a STANDBY state (as shown in FIG. 2A, Selected=STANDBY), the first network device switches a status of the mux machine from the DETACHED state to the WAITING state. Further, the first network device may invoke selection logic to select an aggregator associated with the aggregation port 11. According to FIG. 1, the aggregator is the aggregator 1. The SELECTED state is used to indicate that an appropriate aggregator is selected. The STANDBY state is used to indicate that an appropriate aggregator is selected and that an aggregation function is not enabled for a port associated with the aggregator. When the mux machine is in the WAITING state, the first network device performs starting wait_while_timer. In the WAITING state, if the first network device receives a trigger event, and the first network device determines a status of the aggregation port 11 as an UNSELECTED state (as shown in FIG. 2A, Selected=UNSELECTED), the first network device switches the status of the mux machine from the WAITING state to the DETACHED state. Further, the UNSELECTED state may be triggered by the Selection Logic, or may be triggered by an RX machine.

When the status of the aggregation port 11 is determined as the SELECTED state, and a Ready state is TRUE, the first network device switches the status of the mux machine from the WAITING state to the ATTACHED state. In the WAITING state, if the aggregation port 11 is in the SELECTED state, when wait_while_timer expires, the first network device determines the Ready state as TRUE. That the Ready state is determined as TRUE indicates that wait_while_timer expires, and that the first network device waits for the aggregation port to be attached to the aggregator. In the WAITING state, if the aggregation port 11 is in the STANDBY state, even if wait_while_timer expires, the Ready state is not determined as TRUE, and the WAITING state does not change. In the ATTACHED state, the first network device attaches the aggregation port 11 to the aggregator 1, and after completing the attach process performs determining Actor.Sync as TRUE, which indicates that the aggregation port 11 of the first network device is in the synchronization state, determining Actor.Collecting as FALSE, which indicates that the aggregation port 11 is not in the collecting state, determining Actor.Distributing as FALSE, which indicates that the aggregation port 11 is not in the distributing state, and determining NTT as TRUE.

If the first network device receives a trigger event, and consequently the first network device determines the status of the aggregation port 11 as the UNSELECTED state or the STANDBY state, the first network device switches the status of the mux machine from the ATTACHED state to the DETACHED state. After the mux machine enters the DETACHED state, the first network device detaches the aggregation port 11 from the aggregator 1, and determines corresponding state information of the aggregation port 11 as a state indicated in the DETACHED state in FIG. 2A.

When the aggregation port 11 is in the SELECTED state, and Partner_Oper_Port_State.Synchronization (Partner.Sync) is determined as TRUE, the first network device switches the status of the mux machine from the ATTACHED state to the COLLECTING_DISTRIBUTING state. That Partner.Sync is determined as TRUE indicates that the first network device determines that the aggregation port 21 of the second network device is in the synchronization state, where Partner.Sync is used to instruct the first network device to determine a synchronization state of the aggregation port 21. Further, that Partner.Sync is determined as TRUE may be explained as follows. The first network device learns that the aggregation port 21 is in the synchronization state, and the first network device acknowledges the synchronization state of the aggregation port 21. The first network device determines a state of Partner.Sync based on an LACPDU packet received from the second network device. When the mux machine is in the COLLECTING_DISTRIBUTING state, the first network device performs determining Actor.Collecting as TRUE, which indicates that the aggregation port 11 is in the collecting state, determining Actor.Distributing as TRUE, which indicates that the aggregation port 11 is in the distributing state, and determining NTT as TRUE. In this way, after the mux machine enters the COLLECTING_DISTRIBUTING state, the first network device sets the aggregation port 11 to be UP on a basis that the aggregation port 11 is in the collecting and distributing state. Therefore, the first network device allows the aggregation port 11 to receive and send data packets.

If the first network device receives a trigger event, and consequently determines the status of the aggregation port 11 as the UNSELECTED state or the STANDBY state or determines Partner.Sync as FALSE, the first network device switches the status of the mux machine from the COLLECTING_DISTRIBUTING state to the ATTACHED state. That Partner.Sync is determined as FALSE indicates that the first network device determines that the aggregation port 21 of the second network device is not in the synchronization state.

For an explanation of each state in the flowchart of the method for implementing a mux machine shown in FIG. 2A and FIG. 2B, refer to descriptions in the IEEE 802.1AX. The mux machine shown in FIG. 2A and FIG. 2B may be applied to each aggregation port of the first network device and the second network device. The first network device implements the mux machine shown in FIG. 2A and FIG. 2B on the aggregation port 11. After the mux machine enters the COLLECTING_DISTRIBUTING state, the first network device cannot ensure that the mux machine implemented on the aggregation port 21 of the second network device is also in the COLLECTING_DISTRIBUTING state. For example, if the second network device is abnormal, the mux machine on the aggregation port 21 cannot enter the COLLECTING_DISTRIBUTING state. Consequently, the aggregation port 11 of the aggregated link 1 is in an UP state, and can receive and send data packets, and the aggregation port 21 of the aggregated link 1 is in a DOWN state, and cannot receive or send a data packet. Therefore, an aggregation port on one end of the aggregated link 1 is in the collecting and distributing state, and an aggregation port on the other end is not in the collecting and distributing state. Alternatively, this may be considered that the aggregation port on one end of the aggregated link is UP, and the aggregation port on the other end is DOWN. A data packet sent by the aggregation port that is UP on the aggregated link cannot be received by the aggregation port that is DOWN on the aggregated link, and consequently a packet loss occurs in service traffic.

In this embodiment, a case in which an aggregation port on one end of an aggregated link is in the collecting and distributing state, and an aggregation port on the other end is not in the collecting and distributing state may be referred to as Single-port_UP. That is, a case in which the aggregation port on one end of the aggregated link is UP, and the aggregation port on the other end is DOWN may be referred to as Single-port_UP. The second network device may be abnormal due to an implementation difference between different vendor network devices, a network device fault, a link fault, or the like.

FIG. 1 is used as an example for description. It is assumed that a first LACPDU packet sent by the first network device to the second network device is correct, and a second LACPDU packet sent by the second network device to the first network device is erroneous. The error is, for example, that Actor_System or Actor_Port carried in the second LACPDU packet is erroneous. Actor System in the second LACPDU packet is used to indicate a system identifier of the second network device, and Actor_Port is used to indicate a port number allocated by the second network device to the aggregation port. The second LACPDU packet may be erroneous for the following reasons. The second LACPDU packet is erroneous because another network device on the link between the first network device and the second network device is faulty, the second LACPDU packet is erroneous because the second network device is faulty in a process of delivering the second LACPDU packet from a control plane to a forwarding plane, or the second LACPDU packet is erroneous because the first network device is faulty in a process of reporting the second LACPDU packet from a forwarding plane to a control plane. In this way, the first network device stores erroneous state information of the second network device based on actor state information in the second LACPDU packet, and a partner identified by the first network device based on the second LACPDU packet is not the second network device but an erroneous second network device, and the second network device stores correct state information of the first network device based on actor state information in the first LACPDU packet, and a partner identified by the second network device based on the first LACPDU packet is the correct first network device. Based on LACP implementation, the first network device receives an LACPDU packet (the LACPDU packet may be a correct LACPDU packet, or may be another erroneous LACPDU packet different from the second LACPDU packet) from the second network device again, and switches the status of the mux machine to the COLLECTING_DISTRIBUTING state based on partner state information in the LACPDU packet from the second network device. The second network device receives an LACPDU packet from the first network device again, and determines, based on partner state information (the information is the previously stored erroneous state information of the second network device) in the LACPDU packet from the first network device, that the mux machine does not enter the COLLECTING_DISTRIBUTING state. In this case, the aggregation port of the first network device enters the stable UP state, and the aggregation port of the second network device on the other end of the aggregated link is in the DOWN state. Therefore, the aggregated link is Single-port_UP, and consequently a packet loss occurs in service traffic.

To resolve the foregoing problem, in this embodiment, the mux machine shown in FIG. 2A and FIG. 2B is redesigned, and the mux machine may be applied to the network structure shown in FIG. 1. Therefore, the first network device sets a mux machine on the first aggregation port to be in a PROTECT_WAITING state. When the mux machine is in the PROTECT_WAITING state, the first network device determines that the first aggregation port is not in the collecting and distributing state. Then, the first network device sends a first LACPDU packet to the second network device, where the first LACPDU packet is used to notify the second network device that the first aggregation port is in the collecting and distributing state, and trigger the second network device to set the second aggregation port to be in the collecting and distributing state. In addition, when the first network device determines that a second LACPDU packet that is from the second network device and that is used to indicate that the second aggregation port is in the collecting and distributing state is received, the first network device switches a status of the mux machine from the PROTECT_WAITING state to the COLLECTING_DISTRIBUTING state, and sets the first aggregation port to be in the collecting and distributing state.

In this implementation, Single-port_UP of the aggregated link in the mux machine is detected and processed, thereby alleviating a packet loss generated during service traffic transmission. For a specific implementation of the mux machine, refer to descriptions of subsequent embodiments.

Figure 3:
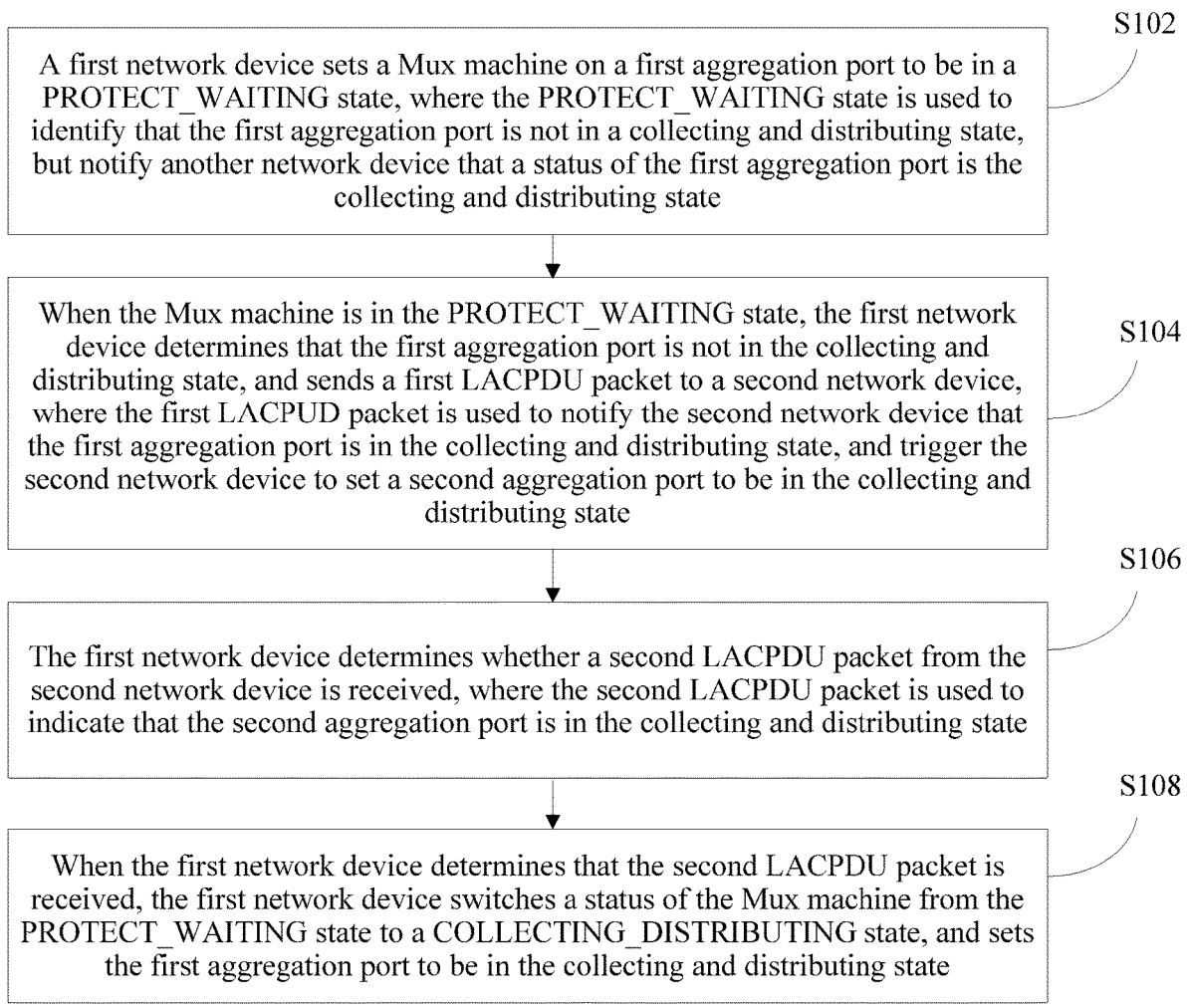
FIG. 3 is a flowchart of a method for implementing a mux machine according to an embodiment.

FIG. 3 is a flowchart of a method for implementing a mux machine according to an embodiment. The method shown in FIG. 3 may be applied to the network running the LACP in FIG. 1. The network includes a first network device and a second network device, a first aggregation port of the first network device is connected to a second aggregation port of the second network device over an aggregated link, and the first network device implements the mux machine on the first aggregation port.

Figure 4:
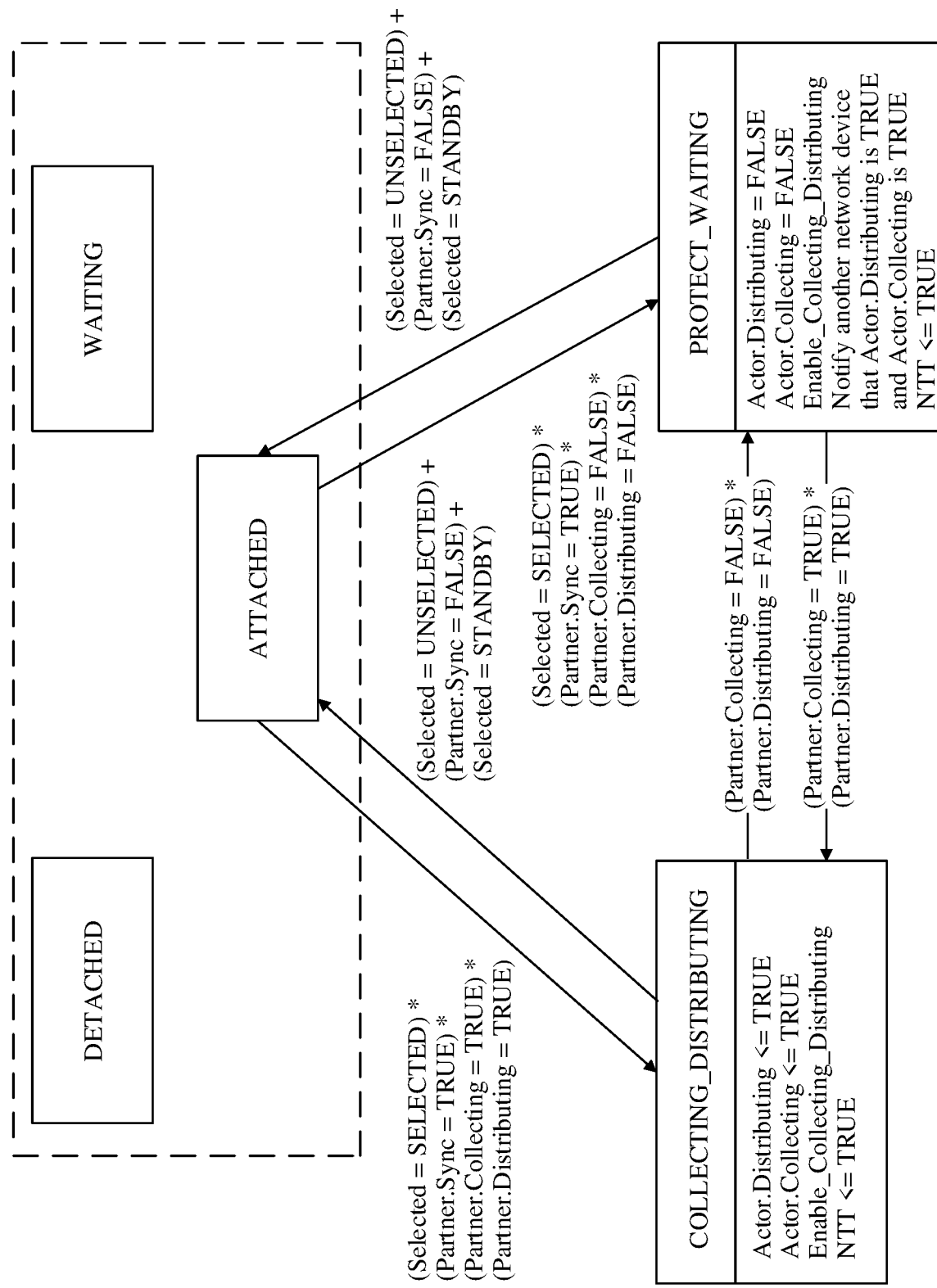
FIG. 4 is a status diagram of another mux machine according to an embodiment.

In this embodiment, the aggregated link 1 in the LAG in FIG. 1 is used as an example for description. The aggregation port 11 of the first network device is connected to the aggregation port 21 of the second network device over the aggregated link 1. It should be understood that the method shown in FIG. 3 may be run on all aggregation ports included in the first network device and all aggregation ports included in the second network device. FIG. 4 is a status diagram of a mux machine according to an embodiment. The method shown in FIG. 3 may be used to implement the mux machine shown in FIG. 4. FIG. 4 shows neither operations performed in a DETACHED state, a WAITING state, and an ATTACHED state nor conditions of switching between the DETACHED state, the WAITING state, and the ATTACHED state. Correspondingly, for the operations performed in the DETACHED state, the WAITING state, and the ATTACHED state and the conditions of switching between the three states in FIG. 4, refer to corresponding parts in FIG. 2A and FIG. 2B. Details are not described again in FIG. 4. In addition, for explanations of mutual switching between the three states, refer to the descriptions in the foregoing embodiment. Details are not described herein again. In addition, explanations of an actor, a partner, "+", and "*" in FIG. 4 are the same as the foregoing descriptions in FIG. 2A and FIG. 2B, and details are not described herein again. In this embodiment, the first aggregation port corresponds to the aggregation port 11 in the example descriptions, and the second aggregation port corresponds to the aggregation port 21 in the example descriptions. In this embodiment, the method shown in FIG. 3 is described with reference to FIG. 1 and FIG. 4, and the method includes the following steps.

Step S102. The first network device sets a mux machine on the first aggregation port to be in a PROTECT_WAITING state, where the PROTECT_WAITING state is used to identify that the first aggregation port is not in a collecting and distributing state, but notify another network device that a status of the first aggregation port is the collecting and distributing state.

For example, the first network device implements the mux machine on the aggregation port 11 of the first network device. The first network device sets the mux machine to be in the PROTECT_WAITING state, as shown in FIG. 4. Compared with the mux machine shown in FIG. 2A and FIG. 2B, for the mux machine shown in FIG. 4, the PROTECT_WAITING state is added between the ATTACHED state and the COLLECTING_DISTRIBUTING state. When a switching condition is met, the first network device may switch a status of the mux machine on the aggregation port 11 between the ATTACHED state and the PROTECT_WAITING state. In addition, when a switching condition is met, the first network device may further switch the status of the mux machine on the aggregation port 11 between the COLLECTING_DISTRIBUTING state and the PROTECT_WAITING state.

The PROTECT_WAITING state is used to identify that the aggregation port 11 is not in the collecting and distributing state, but notify another network device that the status of the aggregation port 11 is the collecting and distributing state. That is, in the PROTECT_WAITING state, the first network device determines that the aggregation port 11 is not in the collecting and distributing state. That the first network device determines that the aggregation port 11 is not in the collecting and distributing state includes keeping, by the first network device, the aggregation port 11 not in the collecting and distributing state, or setting, by the first network device, the aggregation port 11 to be not in the collecting and distributing state. Further, in a possible implementation, if detecting that the aggregation port 11 is not in the collecting and distributing state, the first network device keeps the aggregation port 11 not in the collecting and distributing state. For example, when the status of the mux machine on the aggregation port 11 is switched from the ATTACHED state to the PROTECT_WAITING state, the aggregation port 11 is not in the collecting and distributing state. After the mux machine enters the PROTECT_WAITING state, the first network device keeps the aggregation port 11 not in the collecting and distributing state. In another possible implementation, if detecting that the aggregation port 11 is in the collecting and distributing state, the first network device sets the aggregation port 11 to be not in the collecting and distributing state. For example, when the status of the mux machine on the aggregation port 11 is switched from the COLLECTING_DISTRIBUTING state to the PROTECT_WAITING state, the aggregation port 11 is in the collecting and distributing state. After the mux machine enters the PROTECT_WAITING state, the first network device sets the aggregation port 11 to be not in the collecting and distributing state. In still another possible implementation, the first network device does not detect the status of the aggregation port 11, but directly sets the aggregation port 11 to be not in the collecting and distributing state.

In the PROTECT_WAITING state, after the first network device determines that the aggregation port 11 is not in the collecting and distributing state, the first network device notifies another network device that the status of the aggregation port 11 is the collecting and distributing state. The other network device includes a network device that communicates with the first network device over the aggregated link. The first network device notifies the other network device that the status of the aggregation port 11 is the collecting and distributing state. However, actually, a real status of the aggregation port 11 is not the collecting and distributing state.

Step S104. When the mux machine is in the PROTECT_WAITING state, the first network device determines that the first aggregation port is not in the collecting and distributing state, and sends a first LACPDU packet to the second network device, where the first LACPDU packet is used to notify the second network device that the first aggregation port is in the collecting and distributing state, and trigger the second network device to set the second aggregation port to be in the collecting and distributing state.

For example, when the mux machine on the aggregation port 11 is in the PROTECT_WAITING state, the first network device performs determining Actor.Collecting as FALSE, which indicates that the aggregation port 11 is not in a collecting state, determining Actor.Distributing as FALSE, which indicates that the aggregation port 11 is not in a distributing state, notifying the other network device that Actor.Collecting is TRUE and Actor.Distributing is TRUE, which indicates that the aggregation port 11 is in the collecting and distributing state, and determining NTT as TRUE.

Actor.Collecting and Actor.Distributing may also be represented by Actor.Collecting_Distributing. For example, Actor.Collecting_Distributing is determined as TRUE, which indicates that the aggregation port 11 is in the collecting state and the distributing state, and Actor.Collecting_Distributing is determined as FALSE, which indicates that the aggregation port 11 is not in the collecting state or the distributing state. In this embodiment, both the foregoing two representation manners fall within the scope of "collecting and distributing state". For an implementation in which the first network device determines Actor.Collecting and Actor.Distributing as FALSE, refer to the foregoing description of step S102. Details are not described herein again.

The first network device further sends the first LACPDU packet to the second network device, where the first LACPDU packet is used to notify the second network device that the aggregation port 11 is in the collecting and distributing state. In addition, the first LACPDU packet is further used to trigger the second network device to set the aggregation port 21 to be in the collecting and distributing state. Further, after receiving the first LACPDU packet, the second network device determines, based on the first LACPDU packet, that the status of the aggregation port 11 is the collecting and distributing state, and triggers a process of setting the aggregation port 21 to be in the collecting and distributing state.

The first LACPDU packet is an LACPDU packet that is sent by the first network device to the second network device. The first LACPDU packet carries an Actor_State field, and a length of the Actor_State field is 1 byte. The Actor_State field includes a Collecting flag bit and a Distributing flag bit. The Collecting flag bit and the Distributing flag bit are used to indicate whether the aggregation port 11 is in the collecting and distributing state. For example, when both the Collecting flag bit and the Distributing flag bit are set to 1, it indicates that the aggregation port 11 is in the collecting and distributing state. For formats of the LACPDU packet and Actor_State, refer to descriptions in FIG. 5-8 and FIG. 5-9 in the IEEE 802.1AX. In addition, the second network device may invoke an RX machine to receive and process the first LACPDU packet.

Step S106. The first network device determines whether a second LACPDU packet from the second network device is received, where the second LACPDU packet is used to indicate that the second aggregation port is in the collecting and distributing state.

For example, if the second network device is successfully triggered using the first LACPDU packet, the second network device generates the second LACPDU packet, and sends the second LACPDU packet to the first network device. Alternatively, if the second network device is faulty or abnormal, the aggregation port 21 may be not in the collecting and distributing state. Therefore, when receiving the first LACPDU packet, the second network device cannot send the second LACPDU packet to the first network device.

The first network device detects whether the second LACPDU packet from the second network device is received, where the second LACPDU packet is used to indicate that the aggregation port 21 is in the collecting and distributing state. Therefore, the first network device may determine whether an aggregation port on one end of the aggregated link 1 is in the collecting and distributing state, and an aggregation port on the other end is not in the collecting and distributing state (a non-collecting and non-distributing state). That is, the first network device may detect whether the aggregated link 1 is Single-port_UP. Further, an implementation in which the first network device detects whether the aggregated link 1 is Single-port_UP is as follows. If the aggregation port 21 of the second network device is in the collecting and distributing state, the aggregated link 1 is not Single-port_UP, or if the aggregation port 21 of the second network device is never in the collecting and distributing state, the aggregated link 1 is Single-port_UP.

The second LACPDU packet is an LACPDU packet that is sent by the second network device to the first network device. The second LACPDU packet carries an Actor_State field, and a length of the Actor_State field is 1 byte. The Actor_State field includes a Collecting flag bit and a Distributing flag bit. The Collecting flag bit and the Distributing flag bit are used to indicate whether the aggregation port 21 is in the collecting and distributing state. For example, when both the Collecting flag bit and the Distributing flag bit are set to 1, it indicates that the aggregation port 21 is in the collecting and distributing state. For formats of the LACPDU packet and Actor_State, refer to descriptions in FIG. 5-8 and FIG. 5-9 in the IEEE 802.1AX. In addition, the first network device may invoke an RX machine to receive and process the second LACPDU packet.

Step S108. When the first network device determines that the second LACPDU packet is received, the first network device switches a status of the mux machine from the PROTECT_WAITING state to the COLLECTING_DISTRIBUTING state, and sets the first aggregation port to be in the collecting and distributing state.

According to the LACP, a change in state information of an aggregation port of an actor or a partner may be notified to the other party using an LACPDU packet. For example, a status of a mux machine on the aggregation port 21 of the second network device is switched from the ATTACHED state to the COLLECTING_DISTRIBUTING state, and the second network device switches a collecting state of the aggregation port 21 to "collecting" and switches a distributing state of the aggregation port 21 to "distributing". In this way, state information of the aggregation port 21 changes. The second network device sends the second LACPDU packet to the first network device, where the second LACPDU packet is used to indicate that the aggregation port 21 is in the collecting and distributing state. In the mux machine shown in FIG. 4, the first network device determines whether the second LACPDU packet is received. Therefore, the first network device may determine, based on the second LACPDU packet, whether the aggregation port 21 is in the collecting and distributing state.

If the first network device receives the second LACPDU packet, it indicates that the second network device determines the collecting state of the aggregation port 21 as "collecting" and determines the distributing state of the aggregation port 21 as "distributing". The first network device switches the status of the mux machine from the PROTECT_WAITING state to the COLLECTING_DISTRIBUTING state based on the second LACPDU packet that indicates that the aggregation port 21 of the second network device is in the collecting and distributing state. Further, the first network device determines, on a basis that the Collecting flag bit in the Actor_State field carried in the second LACPDU packet is TRUE, that a value of Partner_Oper_Port_State.Collecting (Partner.Collecting) is TRUE. The first network device determines, on a basis that the Distributing flag bit in the Actor_State field carried in the second LACPDU packet is TRUE, that a value of Partner_Oper_Port_State.Distributing (Partner.Distributing) is TRUE. The first network device switches the status of the mux machine from the PROTECT_WAITING state to the COLLECTING_DISTRIBUTING state on a basis that Partner.Collecting=TRUE and Partner.Distributing=TRUE.

When the mux machine on the aggregation port 11 is in the COLLECTING_DISTRIBUTING state, the first network device sets the aggregation port 11 to be in the collecting and distributing state. Therefore, both the aggregation port 11 and the aggregation port 21 are in the collecting and distributing state. That is, both the aggregation port 11 and the aggregation port 21 of the aggregated link 1 are UP. To be specific, the first network device allows the aggregation port 11 to receive and send data packets, and the second network device allows the aggregation port 21 to receive and send data packets.

For the mux machine shown in FIG. 4, the PROTECT_WAITING state is added such that it is ensured that when the aggregation ports on the two ends of the aggregated link are UP, statuses of mux machines on the aggregation ports are switched to the stable collecting and distributing state.

In the foregoing implementation, in a network scenario of running the LACP, the first network device sets the mux machine on the first aggregation port to be in the PROTECT_WAITING state. When the mux machine is in the PROTECT_WAITING state, the first network device determines that the first aggregation port is not in the collecting and distributing state. Then, the first network device sends the first LACPDU packet to the second network device, where the first LACPDU packet is used to notify the second network device that the first aggregation port is in the collecting and distributing state, and trigger the second network device to set the second aggregation port to be in the collecting and distributing state. In addition, when the first network device determines that the second LACPDU packet that is from the second network device and that is used to indicate that the second aggregation port is in the collecting and distributing state is received, the first network device switches the status of the mux machine from the PROTECT_WAITING state to the COLLECTING_DISTRIBUTING state, and sets the first aggregation port to be in the collecting and distributing state. In this implementation, Single-port_UP of the aggregated link in the mux machine is detected and processed, thereby alleviating a packet loss generated during service traffic transmission.

It should be understood that the method shown in FIG. 3 in this embodiment is described using an example in which the mux machine is implemented on the aggregation port of the first network device. The method shown in FIG. 3 may also be applied to the aggregation port of the second network device. In addition, for a same aggregated link, the mux machine shown in FIG. 4 is implemented on both two aggregation ports of the aggregated link. For example, when the mux machine shown in FIG. 4 is implemented on the aggregation port 11 of the aggregated link 1 shown in FIG. 1, the mux machine shown in FIG. 4 is also implemented on the aggregation port 21 of the aggregated link 1. In addition, in the mux machine on the aggregation port 11, the first network device is considered as an actor, and the second network device is considered as a partner, and in the mux machine on the aggregation port 21, the second network device is considered as an actor, and the first network device is considered as a partner.

Optionally, the first network device includes a timer, and when the mux machine on the first aggregation port is in the PROTECT_WAITING state, the method further includes starting, by the first network device, the timer, and when the first network device determines that the second LACPDU packet from the second network device is not received even if the timer expires, switching, by the first network device, the status of the mux machine from the PROTECT_WAITING state to an ATTACHED state.

For example, the timer is further set in the first network device, and the timer is associated with the aggregation port 11. The first network device detects, during timing by the timer, whether the second LACPDU packet from the second network device is received. The timer may be implemented using a hardware timer or a software timer. The timer is set such that the mux machine on the aggregation port 11 can be prevented from being in the PROTECT_WAITING state for a long time. In a possible implementation, duration of the timer may be set based on an actual networking scenario and a performance requirement of a network device, for example, $3\ s \leq T \leq 90\ s$, where T represents the duration of the timer, and s represents second.

If the first network device never receives the second LACPDU packet during duration from a start of timing to timeout of the timer, the first network device determines that the aggregated link 1 is Single-port_UP. That is, if the first network device never receives the second LACPDU packet even if the timer expires, the first network device may determine that the aggregation port 21 is not in the collecting and distributing state. Based on the foregoing case, the first network device switches the status of the mux machine on the aggregation port 11 from the PROTECT_WAITING state to the ATTACHED state (as shown in FIG. 4). That the first network device never receives the second LACPDU packet even if the timer expires includes the first network device does not receive any LACPDU packet from the second network device during the duration from a start of timing to timeout of the timer, or the first network device receives an LACPDU packet from the second network device during the duration from a start of timing to timeout of the timer, but the LACPDU packet does not indicate that the aggregation port 21 is in the collecting and distributing state.

Optionally, the method further includes when the mux machine is in the COLLECTING_DISTRIBUTING state, and the timer expires, setting, by the first network device, the aggregated link to be Single-port_UP, where Single-port_UP is used to indicate that an aggregation port on one end of the aggregated link is in the collecting and distributing state, and an aggregation port on the other end is not in the collecting and distributing state.

For example, the first network device may further set Single-port_UP. Single-port_UP is used to indicate whether the aggregated link is Single-port_UP. Single-port_UP is deployed in the mux machine, and is triggered based on the timer. Further, in the PROTECT_WAITING state, when the first network device does not receive the second LACPDU packet from the second network device even if the timer expires, the first network device sets a value of the Single-port_UP flag bit to TRUE, that is, Single-port_UP=TRUE. That the value of the Single-port_UP flag bit is set to TRUE indicates that the aggregated link 1 is Single-port_UP. Therefore, when the first network device does not receive the second LACPDU packet even if the timer expires, the first network device switches the status of the mux machine on the aggregation port 11 from the PROTECT_WAITING state to the ATTACHED state, and the first network device sets the value of the Single-port_UP flag bit to TRUE.

After the mux machine on the aggregation port 11 of the first network device enters the ATTACHED state, because the value of the Single-port_UP flag bit is TRUE, the first network device does not switch the status of the mux machine from the ATTACHED state to the PROTECT_WAITING state. Therefore, a further beneficial effect is that Single-port_UP can prevent the status of the mux machine from being repeatedly switched between the ATTACHED state and the PROTECT_WAITING state.

Optionally, when the mux machine is in the DETACHED state, the first network device sets the value of the Single-port_UP flag bit to FALSE.

The DETACHED state may be considered as an initialization stage of the mux machine. In the DETACHED state, the first network device sets the value of the Single-port_UP flag bit to FALSE (Single-port_UP=FALSE), which indicates that the aggregated link 1 is not Single-port_UP. In this embodiment, there may be two cases in which the aggregated link 1 is not Single-port_UP: Both the aggregation port 11 and the aggregation port 21 of the aggregated link 1 are DOWN, or both the aggregation port 11 and the aggregation port 21 of the aggregated link 1 are UP (that the aggregation port 11 is UP includes a case of notifying another network device that the aggregation port 11 is UP). In the DETACHED state, the value of the Single-port_UP flag bit is set to FALSE. This helps to prevent running of the mux machine from being affected by a previous value of the Single-port_UP flag bit.

Optionally, before step S102 or step S104, the mux machine on the first aggregation port is in the ATTACHED state, and the method further includes steps S1001 and S1002 to complete a process in which the first network device switches the status of the mux machine from the ATTACHED state to the PROTECT_WAITING state, as shown in FIG. 4.

Step S1001. The first network device receives a third LACPDU packet from the second network device.

Step S1002. When the first network device determines that the first aggregation port is in a SELECTED state, determines, based on the third LACPDU packet, that the second aggregation port is in a synchronization state, and determines, based on the third LACPDU packet, that the second aggregation port is not in the collecting and distributing state, the first network device switches the status of the mux machine from the ATTACHED state to the PROTECT_WAITING state.

For example, the first network device may invoke Selection Logic to select an aggregator associated with the aggregation port 11. According to FIG. 1, the aggregator is the aggregator 1. SELECTED is used to indicate that an appropriate aggregator is selected. After the aggregator associated with the aggregation port 11 is selected based on the Selection Logic, the first network device may determine that the aggregation port 11 of the first network device is in the SELECTED state (Selected=SELECTED).

The first network device may invoke an RX machine to receive and process the third LACPDU packet using the RX machine. The third LACPDU packet is sent by the second network device. The third LACPDU packet is used to determine whether the aggregation port 21 is in the synchronization state, and the third LACPDU packet is further used to determine whether the aggregation port 21 is in the collecting and distributing state. When the aggregation port 11 is in the SELECTED state, and the first network device determines, based on the third LACPDU packet, that the aggregation port 21 is in the synchronization state, and determines, based on the third LACPDU packet, that the aggregation port 21 is not in the collecting and distributing state, the first network device switches the status of the mux machine on the aggregation port 11 from the ATTACHED state to the PROTECT_WAITING state.

Information that is in the third LACPDU packet and that is used to indicate a status of the aggregation port 21 includes Actor_State, and Actor_State includes a Collecting flag bit and a Distributing flag bit. The first network device determines whether the Collecting flag bit and the Distributing flag bit that are included in Actor_State in the third LACPDU packet are set to TRUE. When the Collecting flag bit and the Distributing flag bit are set to FALSE, the first network device determines that the aggregation port 21 is not in the collecting and distributing state.

In the implementation in steps S1001 and S1002, the mux machine on the aggregation port 11 of the first network device is in the ATTACHED state, and when the first network device determines that the aggregation port 21 is in the synchronization state and that the aggregation port 21 is not in the collecting and distributing state, the first network device switches the status of the mux machine on the aggregation port 11 to the PROTECT_WAITING state. Therefore, it is ensured that after the mux machine enters the PROTECT_WAITING state, detection on a case in which the second aggregation port changes from not being in the collecting and distributing state to being in the collecting and distributing state starts.

In step S1002, optionally, the method further includes steps S10021 and S10022. An implementation in which the first network device determines, based on the third LACPDU packet, that the second aggregation port is in the synchronization state is described in steps S10021 and S10022.

Step S10021. The first network device determines that first information included in the third LACPDU packet matches second information of the first aggregation port that is stored in the first network device, where the first information includes Partner_Port, Partner_Port_Priority, Partner_System, Partner_System_Priority, Partner_Key, and Partner_State.Aggregation, and the second information includes Actor_Port_Number, Actor_Port_Priority, Actor_System, Actor_System_Priority, Actor_Oper_Port_Key, and Actor_Oper_Port_State.Aggregation.

Step S10022. The first network device determines that Actor_State.Synchronization included in the third LACPDU packet is the synchronization state.

The first network device determines, based on the third LACPDU packet, whether the aggregation port 21 is in the synchronization state. Further, the first information in the third LACPDU packet includes Partner_Port, Partner_Port_Priority, Partner_System, Partner_System_Priority, Partner_Key, and Partner_State.Aggregation. The first network device determines whether the foregoing information matches the second information, namely, corresponding operational parameter values for the Actor, stored in the first network device. The corresponding operational parameter values for the Actor stored in the first network device include Actor_Port_Number, Actor_Port_Priority, Actor_System, Actor_System_Priority, Actor_Oper_Port_Key, and Actor_Oper_Port_State.Aggregation. In addition, the information that is in the third LACPDU packet and that is used to indicate the status of the aggregation port 21 includes Actor_State.Synchronization, and Actor_State.Synchronization is a Synchronization flag bit of the Actor_State field in the third LACPDU packet. The first network device determines whether Actor_State.Synchronization in the third LACPDU packet is set to TRUE. For definition of the foregoing information, refer to descriptions in the IEEE 802.1AX. Details are not described herein.

Optionally, information that is used to determine a synchronization state of the aggregation port 21 of the second network device and information that is used to determine the collecting and distributing state of the aggregation port 21 may be carried in different third LACPDU packets. For example, the information that is used to determine the synchronization state of the aggregation port 21 is carried in a third LACPDU packet, and the information that is used to determine the collecting and distributing state of the aggregation port 21 is carried in another third LACPDU packet. The two third LACPDU packets are separately sent by the second network device to the first network device.

The first network device determines that Partner_Port, Partner_Port_Priority, Partner_System, Partner_System_Priority, Partner_Key, and Partner_State.Aggregation that are included in the third LACPDU packet match Actor_Port_Number, Actor_Port_Priority, Actor_System, Actor_System_Priority, Actor_Oper_Port_Key, and Actor_Oper_Port_State.Aggregation that are stored in the first network device. In addition, the first network device determines that Actor_State.Synchronization included in the third LACPDU packet is TRUE, and the first network device determines that the aggregation port 21 is in the synchronization state, that is, the first network device determines Partner.Sync as TRUE. Further, that Partner.Sync is determined as TRUE may be explained as follows. The first network device learns that the aggregation port 21 is in the synchronization state (on a basis that Actor_State.Synchronization=TRUE), and the first network device acknowledges that the aggregation port 21 is in the synchronization state (based on the matching result).

Optionally, the method further includes step S1003, to complete, based on the third LACPDU packet in step S1001, a process in which the first network device switches the status of the mux machine on the first aggregation port from the ATTACHED state to the COLLECTING_DISTRIBUTING state, as shown in FIG. 4.

Step S1003. When the first network device determines, based on the third LACPDU packet, that the second aggregation port is in the synchronization state, and determines, based on the third LACPDU packet, that the second aggregation port is in the collecting and distributing state, the first network device switches the status of the mux machine from the ATTACHED state to the COLLECTING_DISTRIBUTING state, and sets the first aggregation port to be in the collecting and distributing state.

For example, according to step S1001, after receiving the third LACPDU packet, the first network device determines that Partner_Port, Partner_Port_Priority, Partner_System, Partner_System_Priority, Partner_Key, and Partner_State.Aggregation that are included in the third LACPDU packet match Actor_Port_Number, Actor_Port_Priority, Actor_System, Actor_System_Priority, Actor_Oper_Port_Key, and Actor_Oper_Port_State.Aggregation that are stored in the first network device. In addition, the first network device determines that Actor_State.Synchronization included in the third LACPDU packet is TRUE, and the first network device determines that the aggregation port 21 is in the synchronization state. The first network device further determines that the Collecting flag bit and the Distributing flag bit that are included in Actor_State in the third LACPDU packet are TRUE such that the first network device determines that the aggregation port 21 is in the collecting and distributing state. Therefore, the first network device may switch the status of the mux machine from the ATTACHED state to the COLLECTING_DISTRIBUTING state based on the determining result.

The following description is provided in step S1003: In the ATTACHED state, the first network device has determined that the aggregation port 21 is in the collecting and distributing state. Alternatively, this may be considered that the aggregation port 21 is UP. Therefore, the mux machine running on the aggregation port 11 no longer enters the PROTECT_WAITING state, but the status of the mux machine is directly switched from the ATTACHED state to the COLLECTING_DISTRIBUTING state. After the mux machine enters the COLLECTING_DISTRIBUTING state, the first network device sets the aggregation port 11 to be in the collecting and distributing state. That is, Actor.Collecting and Actor.Distributing are determined as TRUE, which indicates that the aggregation port 11 is in the collecting and distributing state. The aggregation port 11 is set to be UP, and the aggregated link 1 enters a stable distributing state.

In step S1003, optionally, the first network device sets the value of the Single-port UP flag bit to FALSE. Such setting is made to prevent a misoperation that may be performed on the mux machine due to old information "Single-port_UP=TRUE" in the mux machine.

In the implementation in step S1003, the mux machine on the aggregation port 11 is in the ATTACHED state, and when the first network device determines that the aggregation port 21 is in the synchronization state and that the aggregation port 21 has been in the collecting and distributing state, the first network device switches the status of the mux machine running on the aggregation port 11 to the COLLECTING_DISTRIBUTING state. Based on the foregoing implementation, when the second aggregation port is in the collecting and distributing state, the first network device quickly enters a dual-port collecting and distributing state, thereby alleviating a packet loss generated during service traffic transmission.

Optionally, the method further includes steps S1101 and S1102, to complete a process in which the first network device switches the status of the mux machine on the first aggregation port from the COLLECTING_DISTRIBUTING state to the PROTECT_WAITING state, as shown in FIG. 4.

Step S1101. The first network device receives a fourth LACPDU packet from the second network device, where the fourth LACPDU packet is used to indicate that the second aggregation port is not in the collecting and distributing state.

Step S1102. When determining, based on the fourth LACPDU packet, that the second aggregation port is not in the collecting and distributing state, the first network device switches the status of the mux machine from the COLLECTING_DISTRIBUTING state to the PROTECT_WAITING state.

Based on the descriptions in the foregoing embodiment, when the mux machine on the aggregation port 11 is in the COLLECTING_DISTRIBUTING state, both the aggregation port 11 and the aggregation port 21 are in the collecting and distributing state, both the two ends of the aggregated link 1 are UP, and the first network device and the second network device forward a data packet to each other over the aggregated link 1.

According to the LACP, a change in state information of an aggregation port of an actor or a partner is notified to the other party using an LACPDU packet. It is assumed that the second network device is abnormal, and consequently the collecting state of the aggregation port 21 is switched from "collecting" to "non-collecting" and the distributing state of the aggregation port 21 is switched from "distributing" to "non-distributing". The second network device sends the fourth LACPDU packet to the first network device, and Actor_State in the fourth LACPDU packet includes a Collecting flag bit and a Distributing flag bit. That Collecting is determined as FALSE indicates that the aggregation port 21 is not in the collecting state. That Distributing is determined as FALSE indicates that the aggregation port 21 is not in the distributing state. The first network device determines, on a basis that the Collecting flag bit in the Actor_State field carried in the fourth LACPDU packet is FALSE, that a value of Partner.Collecting is FALSE. The first network device determines, on a basis that the Distributing flag bit in the Actor_State field carried in the fourth LACPDU packet is FALSE, that a value of Partner.Distributing is FALSE. The first network device switches the status of the mux machine from the COLLECTING_DISTRIBUTING state to the PROTECT_WAITING state on a basis that Partner.Collecting=FALSE and Partner.Distributing=FALSE.

In the implementation in steps S1101 and S1102, the mux machine on the aggregation port 11 is in the COLLECTING_DISTRIBUTING state, and when the first network device determines that the aggregation port 21 is not in the collecting and distributing state, the first network device switches the status of the mux machine on the aggregation port 11 from the COLLECTING_DISTRIBUTING state to the PROTECT_WAITING state. Based on the foregoing implementation, after receiving the fourth LACPDU packet indicating that a status of the second aggregation port is not the collecting and distributing state, the first network device switches the status of the mux machine to the PROTECT_WAITING state in a timely manner. This helps alleviate a packet loss generated during service traffic transmission.

Optionally, the method further includes step S1201, to complete a process in which the first network device switches the status of the mux machine on the first aggregation port from the PROTECT_WAITING state to the ATTACHED state, as shown in FIG. 4.

Step S1201. The first network device switches the status of the mux machine from the PROTECT_WAITING state to the ATTACHED state when at least one of the following conditions is met: the first network device determines that the first aggregation port is in an UNSELECTED state, the first network device determines that the first aggregation port is in a STANDBY state, and the first network device receives a fifth LACPDU packet from the second network device, and determines, based on the fifth LACPDU packet, that the second aggregation port is not in the synchronization state.

For example, when the mux machine on the aggregation port 11 is in the PROTECT_WAITING state, the status of the aggregation port 11 may change. For example, when the aggregator 1 is not selected for the aggregation port 11, the first network device switches a selected state of the aggregation port 11 to UNSELECTED. For another example, when the aggregator 1 is selected for the aggregation port 11 of the first network device, but an aggregation function is not enabled for the aggregation port 11, the first network device switches a selected state of the aggregation port 11 to STANDBY. On a basis that the aggregation port 11 is in the UNSELECTED state or the STANDBY state, the first network device switches the status of the mux machine on the aggregation port 11 from the PROTECT_WAITING state to the ATTACHED state. The UNSELECTED state may be triggered by the Selection Logic, or may be triggered by the RX machine. The STANDBY state may be triggered by the Selection Logic.

When the mux machine running on the aggregation port 11 is in the PROTECT_WAITING state, the first network device may further receive the fifth LACPDU packet from the second network device, where the fifth LACPDU packet is used to determine whether the aggregation port 21 is in the synchronization state. The first network device determines, based on the fifth LACPDU packet, that the aggregation port 21 of the second network device is not in the synchronization state. For an implementation in which the first network device determines, based on the fifth LACPDU packet, that the aggregation port 21 of the second network device is not in the synchronization state, refer to corresponding descriptions of steps S10021 and S10022. Details are not described herein again. On a basis that the aggregation port 21 is not in the synchronization state, the first network device switches the status of the mux machine on the aggregation port 11 from the PROTECT_WAITING state to the ATTACHED state.

Optionally, the method further includes step S1301, to complete a process in which the first network device switches the status of the mux machine from the COLLECTING_DISTRIBUTING state to the ATTACHED state, as shown in FIG. 4.

Step S1301. The first network device switches the status of the mux machine on the first aggregation port from the COLLECTING_DISTRIBUTING state to the ATTACHED state when at least one of the following conditions is met: the first network device determines that the first aggregation port is in an UNSELECTED state, the first network device determines that the first aggregation port is in a STANDBY state, and the first network device receives a fifth LACPDU packet from the second network device, and determines, based on the fifth LACPDU packet, that the second aggregation port is not in the synchronization state.

For an implementation in which the first network device switches the status of the mux machine on the aggregation port 11 from the COLLECTING_DISTRIBUTING state to the ATTACHED state based on a trigger condition, refer to corresponding descriptions of step S1201. Details are not described herein again.

Optionally, after step S1301, the method further includes the following step.

Step S1302. When the mux machine is in the ATTACHED state, the first network device stops the timer.

In the PROTECT_WAITING state, the first network device enables the timer. After the first network device switches the status of the mux machine from the PROTECT_WAITING state to the ATTACHED state based on the foregoing trigger condition, the timer still times. In the ATTACHED state, to avoid Single-port_UP=TRUE that is caused because the timer expires, the first network device stops timing of the timer.

Figure 5:
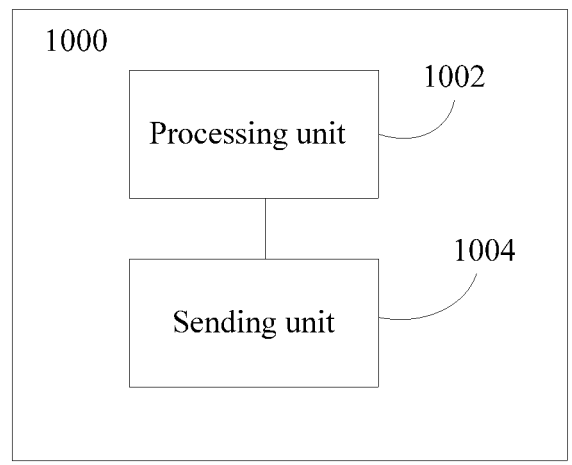
FIG. 5 is a schematic structural diagram of a first network device according to an embodiment.

FIG. 5 is a schematic structural diagram of a first network device 1000 according to an embodiment. The first network device 1000 shown in FIG. 5 may perform corresponding steps performed by the first network device in the method in the foregoing embodiment. The first network device 1000 runs an LACP, and a first aggregation port of the first network device 1000 is connected to a second aggregation port of the second network device over an aggregated link. As shown in FIG. 5, the first network device 1000 includes a processing unit 1002 and a sending unit 1004.

The processing unit 1002 is configured to set a mux machine on the first aggregation port to be in a PROTECT_WAITING state, where the PROTECT_WAITING state is used to identify that the first aggregation port is not in a collecting and distributing state, but notify another network device that a status of the first aggregation port is the collecting and distributing state.

The processing unit 1002 is further configured to determine that the first aggregation port is not in the collecting and distributing state when the mux machine is in the PROTECT_WAITING state.

The sending unit 1004 is configured to send a first LACPDU packet to the second network device, where the first LACPDU packet is used to notify the second network device that the first aggregation port is in the collecting and distributing state, and trigger the second network device to set the second aggregation port to be in the collecting and distributing state.

The processing unit 1002 is further configured to determine whether a second LACPDU packet from the second network device is received, where the second LACPDU packet is used to indicate that the second aggregation port is in the collecting and distributing state.

When the processing unit 1002 determines that the second LACPDU packet is received, the processing unit 1002 is further configured to switch a status of the mux machine from the PROTECT_WAITING state to a COLLECTING_DISTRIBUTING state, and set the first aggregation port to be in the collecting and distributing state.

Optionally, before the mux machine on the first aggregation port is in the PROTECT_WAITING state, the mux machine is in an ATTACHED state, and the first network device 1000 further includes a receiving unit (not shown). The receiving unit is configured to receive a third LACPDU packet from the second network device. When the processing unit 1002 determines that the first aggregation port is in a SELECTED state, determines, based on the third LACPDU packet, that the second aggregation port is in a synchronization state, and determines, based on the third LACPDU packet, that the second aggregation port is not in the collecting and distributing state, the processing unit 1002 is further configured to switch the status of the mux machine from the ATTACHED state to the PROTECT_WAITING state.

Optionally, that the processing unit 1002 determines, based on the third LACPDU packet, that the second aggregation port is in a synchronization state includes that the processing unit 1002 is further configured to determine that first information included in the third LACPDU packet matches second information of the first aggregation port that is stored in the first network device, where the first information includes Partner_Port, Partner_Port_Priority, Partner_System, Partner_System_Priority, Partner_Key, and Partner_State.Aggregation, and the second information includes Actor_Port_Number, Actor_Port_Priority, Actor_System, Actor_System_Priority, Actor_Oper_Port_Key, and Actor_Oper_Port_State. Aggregation, and the processing unit 1002 is further configured to determine that Actor_State.Synchronization included in the third LACPDU packet is the synchronization state.

Optionally, when the processing unit 1002 determines, based on the third LACPDU packet, that the second aggregation port is in the synchronization state, and determines, based on the third LACPDU packet, that the second aggregation port is in the collecting and distributing state, the processing unit 1002 is further configured to switch the status of the mux machine from the ATTACHED state to the COLLECTING_DISTRIBUTING state, and set the first aggregation port to be in the collecting and distributing state.

Optionally, the receiving unit is further configured to receive a fourth LACPDU packet from the second network device, where the fourth LACPDU packet is used to indicate that the second aggregation port is not in the collecting and distributing state. When the processing unit 1002 determines, based on the fourth LACPDU packet, that the second aggregation port is not in the collecting and distributing state, the processing unit 1002 is further configured to switch the status of the mux machine from the COLLECTING_DISTRIBUTING state to the PROTECT_WAITING state.

Optionally, the processing unit 1002 is further configured to switch the status of the mux machine from the PROTECT_WAITING state to the ATTACHED state when the processing unit 1002 determines that at least one of the following conditions is met: the processing unit 1002 is further configured to determine that the first aggregation port is in an UNSELECTED state, the processing unit 1002 is further configured to determine that the first aggregation port is in a STANDBY state, and the processing unit 1002 is further configured to determine, based on a received fifth LACPDU packet from the second network device, that the second aggregation port is not in the synchronization state.

Optionally, when the mux machine on the first aggregation port is in the PROTECT_WAITING state, the processing unit 1002 is further configured to enable a timer. When the processing unit 1002 determines that the second LACPDU packet from the second network device is not received even if the timer expires, the processing unit 1002 is further configured to switch the status of the mux machine from the PROTECT_WAITING state to an ATTACHED state.

Optionally, when the mux machine is in the PROTECT_WAITING state, and the timer expires, the processing unit 1002 is further configured to set the aggregated link to be Single-port_UP, where Single-port_UP is used to indicate that an aggregation port on one end of the aggregated link is in the collecting and distributing state, and an aggregation port on the other end is not in the collecting and distributing state.

Optionally, duration of the timer is greater than or equal to three s and the duration of the timer is less than or equal to 90 s.

The first network device shown in FIG. 5 may perform the corresponding steps performed by the first network device in the method in the foregoing embodiment. The first network device is applied to a network running the LACP, to detect and process statuses of the aggregation ports on the two ends of the aggregated link in the mux machine, thereby alleviating a packet loss generated during service traffic transmission. It should be understood that the structure in FIG. 5 is also applicable to the second network device in FIG. 1.

Figure 6:
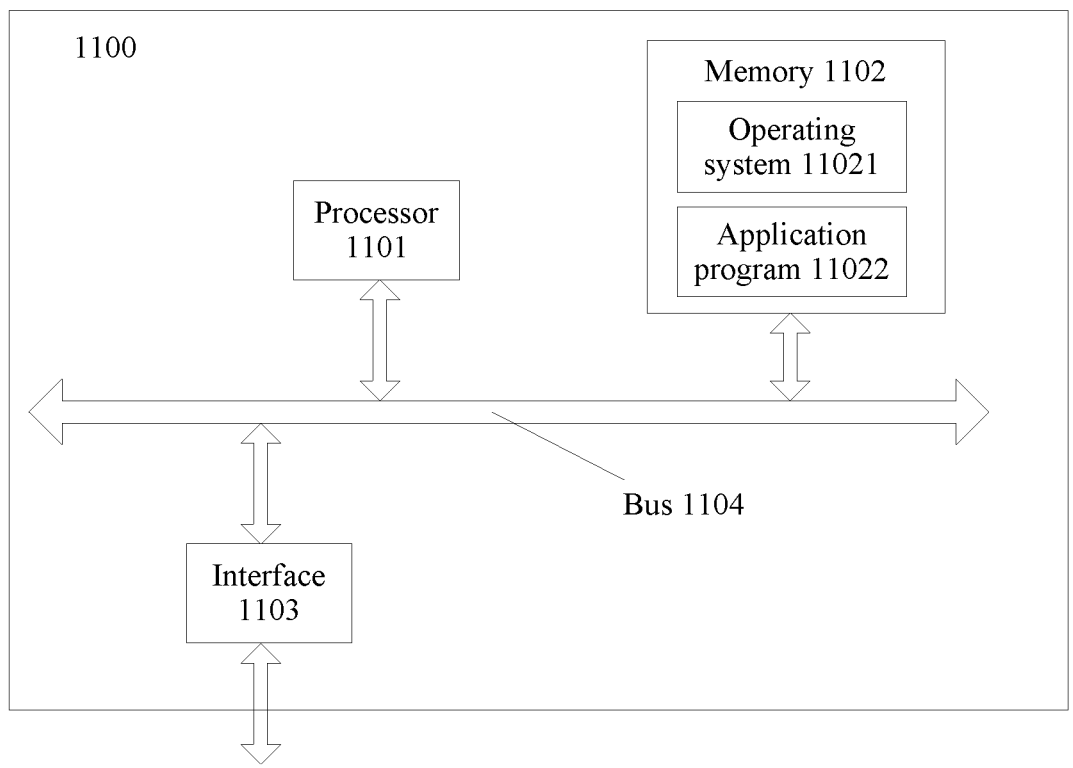
FIG. 6 is a schematic diagram of a hardware structure of a first network device according to an embodiment.

FIG. 6 is a schematic diagram of a hardware structure of a first network device 1100 according to an embodiment. The first network device 1100 shown in FIG. 6 may perform corresponding steps performed by the first network device in the method in the foregoing embodiment.

As shown in FIG. 6, the first network device 1100 includes a processor 1101, a memory 1102, an interface 1103, and a bus 1104. The interface 1103 may be implemented in a wireless or wired manner, and may be a network adapter. The processor 1101, the memory 1102, and the interface 1103 are connected using the bus 1104.

The interface 1103 may include a transmitter and a receiver, and is used by the first network device to receive information from and send information to the second network device in the foregoing embodiment. For example, the interface 1103 is configured to support the first network device 1100 in receiving an LACPDU packet from and sending an LACPDU packet to the second network device. The processor 1101 is configured to perform processing performed by the first network device in the foregoing embodiment. For example, the processor 1101 is configured to set a collecting and distributing state of the first aggregation port, is further configured to determine whether the first aggregation port is in the collecting and distributing state, is further configured to start or stop a timer, is further configured to determine whether an LACPDU packet sent by the second network device is received, and is further configured to switch a status of a mux machine between states, and/or is configured to perform another process in the technologies described in this specification. For example, the processor 1101 is configured to support the steps S102, S104, S106, and S108 in FIG. 3. The memory 1102 includes an operating system 11021 and an application program 11022, and is configured to store a program, code, or an instruction. When executing the program, code, or instruction, the processor or a hardware device may complete processing processes related to the first network device in the method embodiment. Optionally, the memory 1102 may include a ROM and a RAM. The ROM includes a BIOS or an embedded system, and the RAM includes an application program and an operating system. When the first network device 1100 needs to run, a bootloader in the BIOS or the embedded system that is built into the ROM is used to boot a system to start, and boot the first network device 1100 to enter a normal running state. After entering the normal running state, the first network device 1100 runs the application program and the operating system in the RAM to complete the processing processes related to the first network device in the method embodiment.

It may be understood that FIG. 6 shows merely a simplified design of the first network device 1100. In actual application, the first network device may include any quantity of interfaces, processors, or memories. In addition, only the first network device is used as an example for description in this embodiment. It should be understood that the second network device has, or more network devices have, a same function as the first network device, and details are not described herein.

Figure 7:
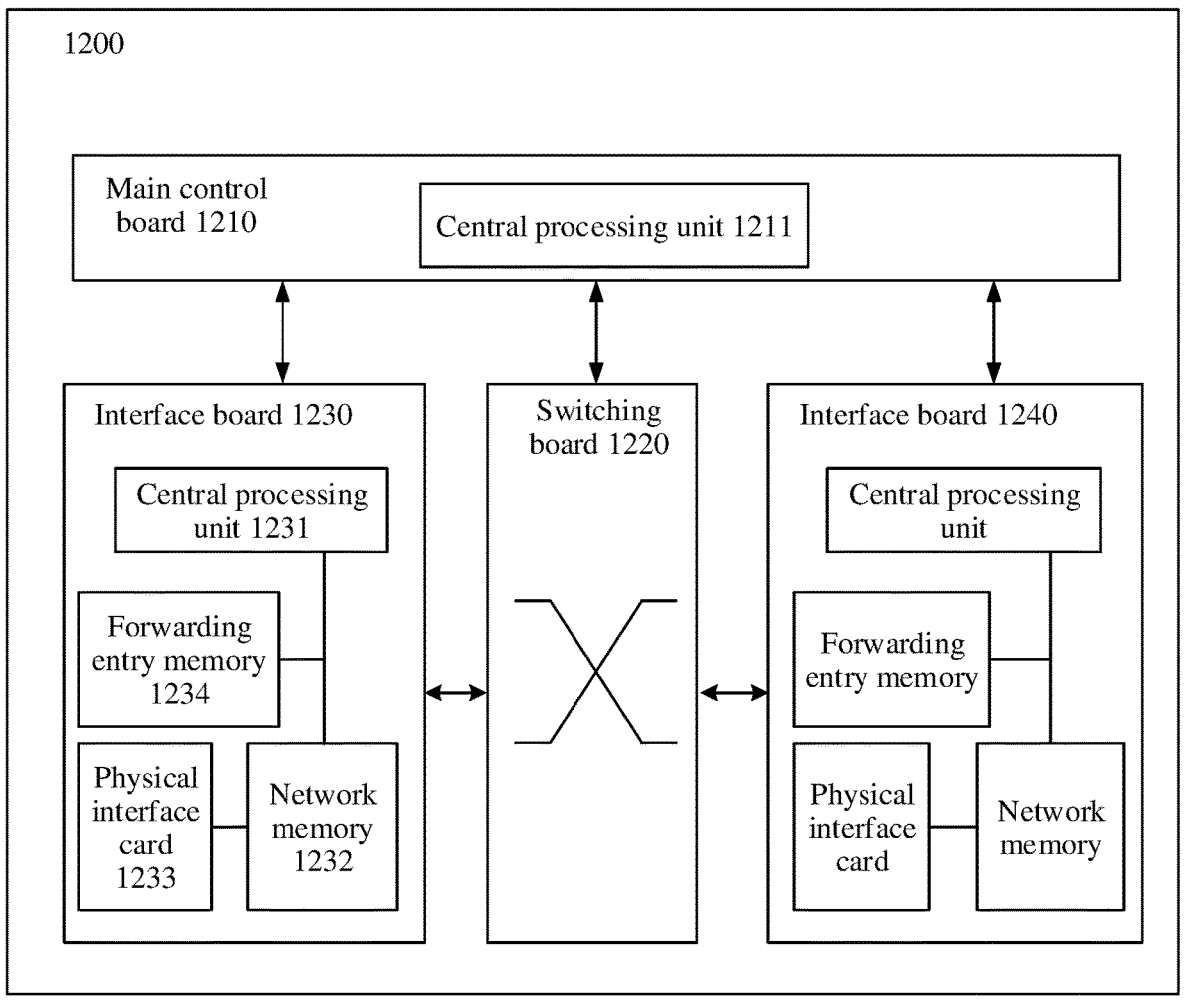
FIG. 7 is a schematic diagram of a hardware structure of another first network device according to an embodiment.

FIG. 7 is a schematic diagram of a hardware structure of another first network device 1200 according to an embodiment. The first network device 1200 shown in FIG. 7 may perform corresponding steps performed by the first network device in the method in the foregoing embodiment.

As shown in FIG. 7, the first network device 1200 includes a main control board 1210, an interface board 1230, a switching board 1220, and an interface board 1240. The main control board 1210 is configured to complete functions such as system management, device maintenance, and protocol processing. The switching board 1220 is configured to complete data exchange between interface boards (the interface board is also referred to as a line card or a service board). The interface board 1230 and the interface board 1240 are configured to provide various service interfaces (for example, a point-of-sale (POS) interface, a Gigabit Ethernet (GE) interface, and an automated teller machine (ATM) interface), and forward a data packet. The main control board 1210, the interface board 1230, the interface board 1240, and the switching board 1220 are connected to a platform backboard using a system bus for interworking. A central processing unit 1231 on the interface board 1230 is configured to control and manage the interface board 1230, and communicate with a central processing unit 1211 on the main control board 1210.

A physical interface card 1233 on the interface board 1230 receives an LACPDU packet from the second network device, and sends the LACPDU packet to the central processing unit 1211 on the main control board 1210 using the central processing unit 1231 on the interface board 1230. The central processing unit 1211 on the main control board 1210 is configured to obtain the LACPDU packet.

The central processing unit 1211 is further configured to set a mux machine on the first aggregation port to be in a PROTECT_WAITING state, where the PROTECT_WAITING state is used to identify that the first aggregation port is not in a collecting and distributing state, but notify another network device that a status of the first aggregation port is the collecting and distributing state. The central processing unit 1211 is further configured to determine that the first aggregation port is not in the collecting and distributing state when the mux machine is in the PROTECT_WAITING state. The central processing unit 1211 is further configured to control the interface board 1230 to send a first LACPDU packet to the second network device, where the first LACPDU packet is used to notify the second network device that the first aggregation port is in the collecting and distributing state, and trigger the second network device to set the second aggregation port to be in the collecting and distributing state. The central processing unit 1211 is further configured to determine whether a second LACPDU packet from the second network device is received, where the second LACPDU packet is used to indicate that the second aggregation port is in the collecting and distributing state. When the central processing unit 1211 determines that the second LACPDU packet is received, the processing unit 1211 is further configured to switch a status of the mux machine from the PROTECT_WAITING state to a COLLECTING_DISTRIBUTING state, and set the first aggregation port to be in the collecting and distributing state.

The central processing unit 1211 is further configured to generate an LACPDU packet. The central processing unit 1211 sends the generated LACPDU packet to the physical interface card 1233 using the central processing unit 1231 on the interface board 1230. The physical interface card 1233 on the interface board 1230 sends the LACPDU packet to the second network device.

A forwarding entry memory 1234 on the interface board 1230 is configured to store a forwarding entry. The central processing unit 1231 on the interface board 1230 is configured to control a network memory 1232 to obtain the forwarding entry in the forwarding entry memory 1234. In addition, the central processing unit 1231 is configured to control the network memory 1232 to receive and send traffic using the physical interface card 1233.

It should be understood that operations on the interface board 1240 are consistent with the operations on the interface board 1230 in this embodiment. For brevity, details are not described. It should be understood that the first network device 1200 in this embodiment may be corresponding to the functions and/or the various implemented steps in the foregoing method embodiment. Details are not described herein again. In addition, only the first network device is used as an example for description in this embodiment. It should be understood that the second network device has, or more network devices have, a same function as the first network device, and details are not described herein.

In addition, it should be noted that there may be one or more main control boards. When there is a plurality of main control boards, a primary main control board and a secondary main control board may be included. There may be one or more interface boards, and the first network device with a stronger data processing capability provides more interface boards. There may be one or more physical interface cards on the interface board. There may be no switching board, or there may be one or more switching boards. When there is a plurality of switching boards, the plurality of switching boards may jointly implement load sharing and redundancy backup. In a centralized forwarding architecture, the first network device may not require the switching board, and the interface board implements a function of processing service data in an entire system. In a distributed forwarding architecture, the first network device may have at least one switching board, and exchange data between a plurality of interface boards using the switching board, to provide a large-capacity data exchange and processing capability. Therefore, a data access and processing capability of the first network device in the distributed architecture is better than that of the device in the centralized architecture. Use of a specific architecture depends on a specific networking deployment scenario. This is not limited herein.

Figure 8:
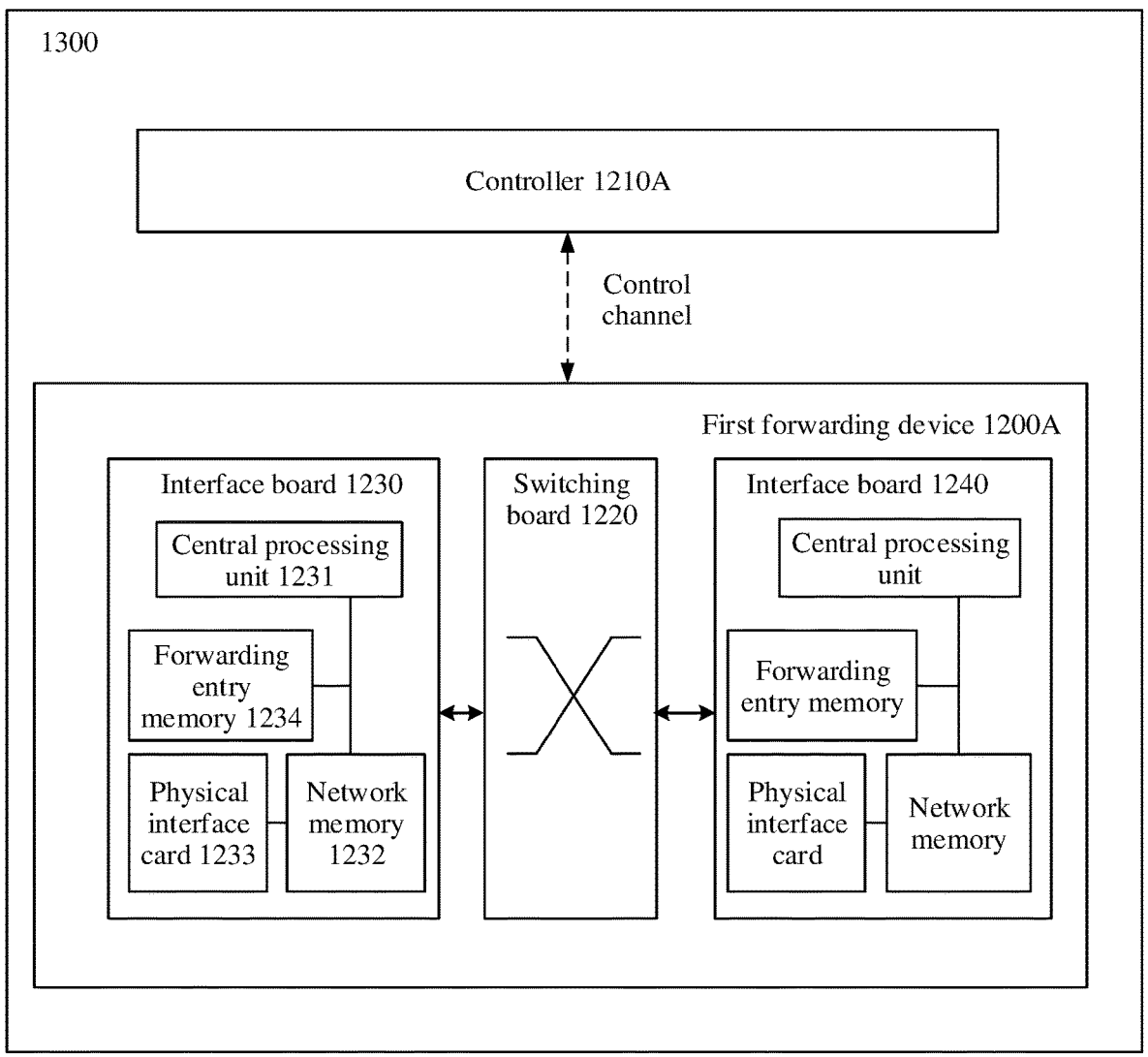
FIG. 8 is a schematic diagram of a hardware structure of a first network system according to an embodiment.

FIG. 8 is a schematic diagram of a hardware structure of a first network system 1300 according to an embodiment. The first network system 1300 shown in FIG. 8 may perform corresponding steps performed by the first network device in the method in the foregoing embodiment.

This product form of the first network system 1300 is applicable to a network architecture (for example, software-defined networking (SDN)) that is based on separation between control and forwarding. In the SDN, the main control board 1210 of the first network device 1200 shown in FIG. 7 is separated from the device, to form a new independent physical device (namely, a controller 1210A shown in FIG. 8), and the remaining components form another independent physical device (namely, a first forwarding device 1200A shown in FIG. 8). The controller 1210A interacts with the first forwarding device 1200A according to a control channel protocol. The control channel protocol may be an OPENFLOW Protocol, a Path Computation Element Communication Protocol (PCEP), a Border Gateway Protocol (BGP), an interface to the routing system (I2RS), or the like. That is, compared with the embodiment corresponding to FIG. 7, the first network system 1300 in this embodiment includes the separated controller 1210A and the first forwarding device 1200A.

The controller 1210A may be implemented based on a general-purpose physical server or a dedicated hardware structure. In a design example, the controller includes a receiver, a processor, a transmitter, a RAM, a ROM, and a bus (not shown in the figure). The processor is coupled to the receiver, the transmitter, the RAM, and the ROM using the bus. When the controller needs to run, a bootloader in a BIOS or an embedded system that is built into the ROM is used to boot the system to start, and boot the controller to enter a normal running state. After entering the normal running state, the controller runs an application program and an operating system in the RAM, to enable the processor to perform all functions and steps of the main control board 1210 in FIG. 7.

The first forwarding device 1200A may be implemented based on a dedicated hardware structure. A function and a structure of the first forwarding device 1200A is kept consistent with functions and structures of the interface board 1230, the interface board 1240, and the switching board 1220 in FIG. 7, to perform corresponding functions and steps. Alternatively, the first forwarding device 1200A may be a virtual first forwarding device implemented based on a general-purpose physical server and a network functions virtualization (NFV) technology, and the virtual first forwarding device is a virtual router. In a scenario of the virtual first forwarding device, the interface board, the switching board, and the processor that are included in the foregoing physical first forwarding device in the embodiment of the first forwarding device can be considered as an interface resource, a network resource, and a processing resource that are allocated by the first forwarding device to the virtual first forwarding device for use based on a general-purpose physical server in a virtual environment. For details of implementing a function or step of the first forwarding device using the general-purpose physical server, or for details of implementing a function or step of the first forwarding device using the general-purpose physical server and the NFV technology, refer to the embodiment in FIG. 7.

It should be understood that, the controller 1210A and the first forwarding device 1200A in the first network system 1300 in this embodiment may implement various functions and steps implemented by the first network device in the method embodiment. For brevity, details are not described herein again. In addition, only the first network device is used as an example for description in this embodiment. It should be understood that the second network device has, or more network devices have, a same function as the first network device, and details are not described herein.

In addition, an embodiment provides a computer storage medium configured to store a computer software instruction used by the foregoing first network device. The computer storage medium includes a program designed for executing the foregoing method embodiment.

As shown in FIG. 1, an embodiment further includes a network system for implementing a mux machine. The network system includes a first network device and a second network device, and the first network device and/or the second network device each are/is the first network device in FIG. 5, FIG. 6, or FIG. 7. Alternatively, the first network device and/or the second network device each are/is the first network system in FIG. 8.

Method or algorithm steps described in combination with the content disclosed may be implemented by hardware, or may be implemented by a processor by executing a software instruction. The software instruction may include a corresponding software module. The software module may be stored in a RAM, a flash memory, a ROM, an erasable programmable ROM (EPROM), an electrically EPROM (EEPROM), a register, a hard disk, a removable hard disk, a compact disc ROM (CD-ROM), or a storage medium of any other form known in the art. An example storage medium is coupled to a processor such that the processor can read information from the storage medium or can write information into the storage medium. Certainly, the storage medium may be a component of the processor. The processor and the storage medium may be located in an application-specific integrated circuit (ASIC). In addition, the ASIC may be located in user equipment. Certainly, the processor and the storage medium may exist in the user equipment as discrete components.

A person skilled in the art should be aware that in the foregoing one or more examples, the functions described in this disclosure may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and beneficial effects of this disclosure are further described in detail in the foregoing specific implementations. It should be understood that the foregoing descriptions are merely specific implementations.

What is claimed is:

1. A method for implementing a multiplexer (mux) machine implemented by a first network device, wherein the method is applied to a network running a Link Aggregation Control Protocol (LACP), wherein the network comprises the first network device and a second network device, wherein a first aggregation port of the first network device is coupled to a second aggregation port of the second network device over an aggregated link, and wherein the method comprises:
    setting the mux machine on the first aggregation port to a protect_waiting state, wherein the protect_waiting state identifies that the first aggregation port is not in a collecting and distributing state and notifies another network device that a status of the first aggregation port is the collecting and distributing state;
    determining that the first aggregation port is not in the collecting and distributing state when the mux machine is in the protect_waiting state;
    sending a first LACP data unit (LACPDU) packet to the second network device, wherein the first LACPDU packet notifies the second network device that the first aggregation port is in the collecting and distributing state and triggers the second network device to set the second aggregation port to the collecting and distributing state;
    receiving a second LACPDU packet from the second network device, wherein the second LACPDU packet indicates that the second aggregation port is in the collecting and distributing state;
    switching, in response to receiving the second LACPDU packet, a status of the mux machine from the protect_waiting state to the collecting and distributing state; and
    setting the first aggregation port to the collecting and distributing state;
    identifying that the mux machine is in the protect_waiting state and that the second LACPDU packet from the second network device is not received within three to ninety seconds; and
    setting the aggregated link to single-port_up, wherein the single-port_up indicates that an aggregation port on a first end of the aggregated link is in the collecting and distributing state and that an aggregation port on a second end of the aggregated link is not in the collecting and distributing state.

2. The method of claim 1, wherein before setting the mux machine to the protect_waiting state, the mux machine is in an attached state, and wherein the method further comprises:
    receiving a third LACPDU packet from the second network device;
    determining that the first aggregation port is in a selected state;
    determining, based on the third LACPDU packet, that the second aggregation port is in a synchronization state;
    determining, based on the third LACPDU packet, that the second aggregation port is not in the collecting and distributing state; and
    switching the status of the mux machine from the attached state to the protect_waiting state.

3. The method of claim 2, further comprising:
    determining that first information in the third LACPDU packet matches second information of the first aggregation port that is stored in the first network device, wherein the first information comprises Partner_Port, Partner_Port_Priority, Partner_System, Partner_System_Priority, Partner_Key, and Partner_State.Aggregation, and wherein the second information comprises Actor_Port_Number, Actor_Port_Priority, Actor_System, Actor_System_Priority, Actor_Oper_Port_Key, and Actor_Oper_Port_State.Aggregation; and determining that Actor_State.Synchronization in the third LACPDU packet is the synchronization state.

4. The method of claim 2, comprising:

determining, based on the third LACPDU packet, that the second aggregation port is in the collecting and distributing state;

switching the status of the mux machine from the attached state to the collecting and distributing state; and setting the first aggregation port to the collecting and distributing state.

5. The method of claim 2, further comprising:

determining that the first aggregation port is in an unselected state; and switching the status of the mux machine from the protect_waiting state to the attached state.

6. The method of claim 2, further comprising:

determining that the first aggregation port is in a standby state; and switching the status of the mux machine from the protect_waiting state to the attached state.

7. The method of claim 2, further comprising:

receiving a fifth LACPDU packet from the second network device;

determining, based on the fifth LACPDU packet, that the second aggregation port is not in the synchronization state; and switching the status of the mux machine from the protect_waiting state to the attached state.

8. The method of claim 1, further comprising:

receiving a fourth LACPDU packet from the second network device, wherein the fourth LACPDU packet indicates that the second aggregation port is not in the collecting and distributing state;

determining, based on the fourth LACPDU packet, that the second aggregation port is not in the collecting and distributing state; and switching the status of the mux machine from the collecting and distributing state to the protect_waiting state.

9. The method of claim 1, wherein the first network device comprises a timer, and wherein when the mux machine is in the protect waiting state, the method further comprises:

the timer and determining, before the timer expires, that the second LACPDU packet from the second network device is not received; and switching the status of the mux machine from the protect_waiting state to an attached state.

10. A first network device running a Link Aggregation Control Protocol (LACP), comprising:

a first aggregation port coupled to a second aggregation port of a second network device over an aggregated link;

a non-transitory memory configured to store instructions; and a processor coupled to the non-transitory memory, wherein the instructions, when executed by the processor, cause the first network device to:

set a mux machine on the first aggregation port to a protect_waiting state, wherein the protect_waiting state identifies that the first aggregation port is not in a collecting and distributing state and notifies another network device that a status of the first aggregation port is the collecting and distributing state;

determine that the first aggregation port is not in the collecting and distributing state when the mux machine is in the protect_waiting state;

send a first LACP data unit (LACPDU) packet to the second network device, wherein the first LACPDU packet notifies the second network device that the first aggregation port is in the collecting and distributing state and triggers the second network device to set the second aggregation port to the collecting and distributing state;

receive a second LACPDU packet from the second network device, wherein the second LACPDU packet indicates that the second aggregation port is in the collecting and distributing state;

switch, in response to receiving the second LACPDU packet, a status of the mux machine from the protect_waiting state to the collecting and distributing state; and set the first aggregation port to the collecting and distributing state;

identify that the mux machine is in the protect_waiting state and that the second LACPDU packet from the second network device is not received within three to ninety seconds; and set the aggregated link to single-port_up, wherein the single-port_up indicates that an aggregation port on a first end of the aggregated link is in the collecting and distributing state and that an aggregation port on a second end of the aggregated link is not in the collecting and distributing state.

11. The first network device of claim 10, wherein before setting the mux machine to the protect_waiting state, the mux machine is in an attached state, and wherein the instructions, when executed by the processor, further cause the first network device to:

receive a third LACPDU packet from the second network device;

determine that the first aggregation port is in a selected state;

determine, based on the third LACPDU packet, that the second aggregation port is in a synchronization state;

determine, based on the third LACPDU packet, that the second aggregation port is not in the collecting and distributing state; and switch the status of the mux machine from the attached state to the protect_waiting state.

12. The first network device of claim 11, wherein the instructions, when executed by the processor, further cause the first network device to:

determine that first information in the third LACPDU packet matches second information of the first aggregation port that is stored in the first network device, wherein the first information comprises Partner_Port, Partner_Port_Priority, Partner_System, Partner_System_Priority, Partner_Key, and Partner_State.Aggregation, and wherein the second information comprises Actor_Port_Number, Actor_Port_Priority, Actor_System, Actor_System_Priority, Actor_Oper_Port_Key, and Actor_Oper_Port_State.Aggregation; and determine that Actor_State.Synchronization in the third LACPDU packet is the synchronization state.

13. The first network device of claim 11, wherein the instructions, when executed by the processor, further cause the first network device to:
- determine, based on the third LACPDU packet, that the second aggregation port is in the collecting and distributing state;
- switch the status of the mux machine from the attached state to the collecting and distributing state; and
- set the first aggregation port to the collecting and distributing state.

14. The first network device of claim 13, wherein the instructions, when executed by the processor, further cause the first network device to:
- determine that the first aggregation port is in an unselected state; and
- switch the status of the mux machine from the protect_waiting state to the attached state.

15. The first network device of claim 11, wherein the instructions, when executed by the processor, further cause the first network device to switch the status of the mux machine from the protect_waiting state to the attached state when the processor determines that the first aggregation port is in an unselected state, when the processor determines that the first aggregation port is in a standby state or when the processor receives a fifth LACPDU packet from the second network device and determines, based on the fifth LACPDU packet, that the second aggregation port is not in the synchronization state.

16. The first network device of claim 11, wherein the instructions, when executed by the processor, further cause the first network device to:
- determine that the first aggregation port is in a standby state; and
- switch the status of the mux machine from the protect_waiting state to the attached state.

17. The first network device of claim 11, wherein the instructions, when executed by the processor, further cause the first network device to:
- receive a fifth LACPDU packet from the second network device;
- determine, based on the fifth LACPDU packet, that the second aggregation port is not in the synchronization state; and
- switch the status of the mux machine from the protect_waiting state to the attached state.

18. The first network device of claim 10, wherein the instructions, when executed by the processor, further cause the first network device to:
- receive a fourth LACPDU packet from the second network device, wherein the fourth LACPDU packet indicates that the second aggregation port is not in the collecting and distributing state;
- determine, based on the fourth LACPDU packet, that the second aggregation port is not in the collecting and distributing state; and
- switch the status of the mux machine from the collecting and distributing state to the protect_waiting state.

19. The first network device of claim 10, wherein the first network device further comprises a timer, and wherein when the mux machine is in the protect_waiting state, the instructions, when executed by the processor, further cause the first network device to:
- start the timer and determine, before the timer expires, that the second LACPDU packet from the second network device is not received; and
- switch the status of the mux machine from the protect_waiting state to an attached state.

20. The first network device of claim 19, wherein the instructions, when executed by the processor, further cause the first network device to:
- identify that the mux machine is in the protect_waiting state and that the timer expires; and
- set the aggregated link to be single-port_up, wherein the single-port_up indicates that an aggregation port on a first end of the aggregated link is in the collecting and distributing state and that an aggregation port on a second end is not in the collecting and distributing state.

* * * * *